(12) United States Patent
Segev et al.

(10) Patent No.: US 8,621,543 B2
(45) Date of Patent: Dec. 31, 2013

(54) DISTRIBUTED STATISTICAL MULTIPLEXING OF MULTI-MEDIA

(75) Inventors: Doron Segev, Tel-Aviv (IL); Ron Gutman, Zichron-Yaakov (IL)

(73) Assignee: Imagine Communications Ltd., Netanya (IL)

( * ) Notice: Subject to any disclaimer, the term of this patent is extended or adjusted under 35 U.S.C. 154(b) by 1610 days.

(21) Appl. No.: 11/296,923

(22) Filed: Dec. 8, 2005

(65) Prior Publication Data

US 2006/0195881 A1    Aug. 31, 2006

Related U.S. Application Data

(60) Provisional application No. 60/634,365, filed on Dec. 8, 2004.

(51) Int. Cl.
*H04N 7/173* (2011.01)
*H04N 7/12* (2006.01)
*H04N 11/02* (2006.01)
*H04N 11/04* (2006.01)

(52) U.S. Cl.
USPC . 725/118; 725/119; 375/240.01; 375/240.12; 375/240.15; 375/240.17; 375/240.24; 375/240.25; 375/240.29

(58) Field of Classification Search
USPC ........................................ 375/240.01–240.29
See application file for complete search history.

(56) References Cited

U.S. PATENT DOCUMENTS

| | | | |
|---|---|---|---|
| 5,561,637 A | | 10/1996 | Dan et al. |
| 5,579,050 A | * | 11/1996 | Jung ........................ 375/240.14 |
| 5,687,257 A | * | 11/1997 | Paik et al. ..................... 382/239 |
| 5,768,535 A | | 6/1998 | Chaddha et al. |
| 5,847,760 A | * | 12/1998 | Elmaliach et al. ......... 348/390.1 |
| 5,956,088 A | * | 9/1999 | Shen et al. ............... 375/240.25 |
| 6,054,943 A | | 4/2000 | Lawrence |
| 6,064,776 A | * | 5/2000 | Kikuchi et al. ............... 382/260 |
| 6,081,295 A | * | 6/2000 | Adolph et al. ........... 375/240.03 |
| 6,108,382 A | | 8/2000 | Gringeri et al. |

(Continued)

FOREIGN PATENT DOCUMENTS

| EP | 1 069 770 | 7/2000 |
|---|---|---|
| EP | 1 439 707 | 7/2004 |

(Continued)

OTHER PUBLICATIONS

Ng et al. "An Adaptive Multiresolution Modification of the H.263 Video Coding Algorithm", International Conference on Information, Communications and Signal Processing, 1CICS'97, Singapore, 1: 288-291, 1997.

(Continued)

*Primary Examiner* — Mushfikh Alam
(74) *Attorney, Agent, or Firm* — D. Kligler I.P. Services Ltd.

(57) ABSTRACT

A method of distributed statistical multiplexing of video data. The method includes generating a plurality of blocks forming a pre-processed video media corresponding to an original video media, the plurality of blocks including, for one or more sub-portions of the original video media, a plurality of interchangeable blocks that represent the sub-portion. Optionally, at least some of the blocks are transmitted to at least one multiplexer and reconstructed by the at least one multiplexer, for a plurality of communication channels, from at least some of the transmitted blocks.

63 Claims, 6 Drawing Sheets

(56) References Cited

U.S. PATENT DOCUMENTS

| | | | |
|---|---|---|---|
| 6,141,381 A * | 10/2000 | Sugiyama | 375/240.16 |
| 6,167,085 A | 12/2000 | Saunders et al. | |
| 6,192,083 B1 | 2/2001 | Linzer et al. | |
| 6,215,824 B1 | 4/2001 | Assuncao | |
| 6,222,841 B1 | 4/2001 | Taniguchi | |
| 6,310,915 B1 | 10/2001 | Wells et al. | |
| 6,373,530 B1 * | 4/2002 | Birks et al. | 348/584 |
| 6,542,546 B1 | 4/2003 | Vetro et al. | |
| 6,606,746 B1 * | 8/2003 | Zdepski et al. | 725/37 |
| 6,674,796 B1 | 1/2004 | Haskell et al. | |
| 6,697,425 B1 * | 2/2004 | Nakagawa et al. | 375/240 |
| 6,879,634 B1 | 4/2005 | Oz et al. | |
| 7,058,677 B1 | 6/2006 | Laksono et al. | |
| 7,082,167 B2 | 7/2006 | Alexandre | |
| 7,162,584 B2 | 1/2007 | Adl-Tabatabai et al. | |
| 2001/0026591 A1 * | 10/2001 | Keren et al. | 375/240.26 |
| 2001/0047517 A1 | 11/2001 | Christopoulos et al. | |
| 2002/0191640 A1 * | 12/2002 | Haymes et al. | 370/466 |
| 2003/0012275 A1 | 1/2003 | Boice et al. | |
| 2003/0043923 A1 * | 3/2003 | Zhang et al. | 375/240.27 |
| 2003/0112870 A1 * | 6/2003 | Fukuda et al. | 375/240.12 |
| 2003/0142872 A1 * | 7/2003 | Koyanagi | 382/236 |
| 2003/0202592 A1 * | 10/2003 | Sohn et al. | 375/240.16 |
| 2004/0031062 A1 * | 2/2004 | Lemmons | 725/136 |
| 2004/0148628 A1 * | 7/2004 | Mears | 725/43 |
| 2005/0002453 A1 | 1/2005 | Chang et al. | |
| 2005/0010626 A1 | 1/2005 | Laksono et al. | |
| 2005/0058200 A1 | 3/2005 | Lu et al. | |
| 2005/0068993 A1 * | 3/2005 | Russell et al. | 370/537 |
| 2005/0152274 A1 * | 7/2005 | Simpson, III | 370/235 |
| 2005/0232497 A1 | 10/2005 | Yogeshwar et al. | |
| 2005/0262257 A1 * | 11/2005 | Major et al. | 709/231 |
| 2005/0276580 A1 | 12/2005 | Zacek | |
| 2006/0165168 A1 | 7/2006 | Boice et al. | |
| 2006/0215751 A1 * | 9/2006 | Reichel et al. | 375/240.03 |
| 2007/0016594 A1 | 1/2007 | Visharam et al. | |
| 2007/0039028 A1 * | 2/2007 | Bar | 725/95 |
| 2007/0121651 A1 | 5/2007 | Casey et al. | |
| 2007/0291942 A1 * | 12/2007 | Candelore et al. | 380/216 |
| 2008/0049834 A1 * | 2/2008 | Holcomb et al. | 375/240.2 |
| 2013/0094583 A1 * | 4/2013 | Abe et al. | 375/240.12 |

FOREIGN PATENT DOCUMENTS

| | | |
|---|---|---|
| KR | 2002/0077074 | 11/2002 |
| WO | WO 98/43177 | 10/1998 |
| WO | WO 01/47283 | 6/2001 |
| WO | WO01/95612 | 12/2001 |
| WO | WO 2004/025405 | 3/2004 |
| WO | WO 2005/109895 | 11/2005 |
| WO | WO 2006/061838 | 6/2006 |
| WO | WO 2006/099086 | 9/2006 |

OTHER PUBLICATIONS

Guillotel et al., "Adaptive Encoders: The New Generation of MPEG-2 Encoders"; SMPTE Journal, Apr. 2000, p. 287-294.

Hoang et al., "Multiplexing VBR Video Sequences onto a CBR Channel with Lexicographic Optimization", Proceedings., International Conference, vol. 1, Issue 26-29, Oct. 1997, p. 369-372.

Vetro et al., "MPEG-4 Rate Control for Multiple Video Objects"; IEEE Transactions on Circuits and Systems for Video Technology, vol. 4, No. 1, Feb. 1999, p. 186-199.

Cheng et al., "The Analysis of MPEG-4 Core Profile and its system design"; Proceeding of Multimedia Technology and Applications Conference (MTAC'01), Nov. 2001, 5 pages.

Song et al., "Real-time encoding frame rate control for H.263+ video over the Internet"; Signal Processing: Image Communication 15, 1999, p. 127-148.

Hoang et al.,"Real -Time VBR Rate Control of MPEG Video Based upon Lexicographic Bit Allocation", Data Compression Conference, 1999, 99 vol., Issue 29-31, Mar 1999, p. 374-383.

McCanne et al., "Receiver-Driven Layered Multicast", ACM SIGCOMM '96, Aug. 1996, Stanford, CA, 14 pages.

Bolot et al., "Scalable Feedback Control for Multicast Video Distribution in the Internet", SIGCOMM 94-8/94, London, England, p. 58-67.

Boroczky et al., "Statistical multiplexing using MPEG-2 video encoders"; IBM Journal of Research and Development, vol. 43, No. 4, Jul. 1999, p. 511-519.

Wang et al., "Image Quality Assessment: From Error Visibility to Structural Similarity"; IEEE Transactions on Image Processing, vol. 13, No. 4, Apr. 2004, p. 600-612.

U.S. Appl. No. 60/566,831, filed Apr. 30, 2004, Major, et al.

* cited by examiner

DISTRIBUTED STATISTICAL MULTIPLEXING OF MULTI-MEDIA

RELATED APPLICATIONS

This application claims the benefit under 119(e) of U.S. provisional patent application 60/634,365, filed Dec. 8, 2004, the disclosure of which is incorporated herein by reference.

FIELD OF THE INVENTION

The present invention relates to communication systems and in particular to systems for delivery of video signals.

BACKGROUND OF THE INVENTION

Delivering video content requires large amounts of bandwidth. Even when optical cables are provided with capacity for many tens of uncompressed channels, it is desirable to deliver even larger numbers of channels using data compression. Therefore, video compression methods (e.g., MPEG 2, H.264, Windows Media 9, SMTPE VC-9) are used to compress the video signals. With the advent of video on demand (VoD), the bandwidth needs are even greater.

In the MPEG-2 compression standard, a video stream is compressed into a stream of media units. Each media unit relates to a physical aspect of the compressed video stream, such as a group of pictures (GOP), frame, slice or macroblock. The media units may have different data sizes in bits according to the specific momentary content of the video stream (e.g., frames with many details or few details, similar adjacent frames or largely varying sequences of frames). The stream of media units is packaged into transport stream (TS) packets, generally having fixed sizes.

The strength of the compression may be selected as a compromise between reducing bandwidth and signal quality.

U.S. Pat. No. 6,054,943 to Lawrence, the disclosure of which is incorporated herein by reference, describes a video compression method in which two preprocessing modules are used to calculate lossless and lossy compression representations, respectively, for a video content. The compression varies seamlessly between lossy and lossless modes according to the attributes of the cannel.

Compression is generally a complex process that requires large processing resources. Therefore it is desired to perform the compression in advance, when possible. In addition, compression is often performed in a central location rather than in a plurality of remote locations. In these cases, the unit performing the compression does not have information on the current requirements of the channel and therefore the method of Lawrence does not achieve better compression than other compression methods.

There are networks in which each local transmission channel that carries one or more video streams is governed by a local statistical multiplexer that also adjusts the size of the video stream according to the available bandwidth (i.e., the bit rate which can be transmitted) of the channel. When necessary, the statistical multiplexer decompresses the video stream and recompresses the video stream at a lower rate. This, however, requires large processing resources and adds to the delay.

In order to reduce the processing load, there are video on demand (VoD) systems, e.g., multi bit rate (MBR) systems, in which two copies of a movie are stored. When a client requests the movie, the copy best suitable for the connection of the client to the VoD system is supplied to the client.

U.S. Pat. No. 5,768,535 to Chaddha et al., the disclosure of which is incorporated herein by reference, describes a scalable video compression method in which an image is repeatedly down scaled a plurality of times and error images describing the differences between the down-scaled images are generated. The images of each downscaling are encoded separately and transmitted on a transmission link. At a receiving end, a decoder extracts from the stream those portions that it can handle on its bandwidth.

U.S. Pat. No. 6,879,634 to Oz et al., the disclosure of which is incorporated herein by reference, describes a method of scaleable transmission of video.

U.S. Pat. No. 6,222,841 to Taniguchi, the disclosure of which is incorporated herein by reference, describes a system in which video streams include packets that can be discarded for stream shaping. When necessary, statistical multiplexers drop some or all of the discardable packets.

U.S. Pat. No. 6,108,382 to Gringeri et al., the disclosure of which is incorporated herein by reference, describes a method for transmission of video.

In some cases, video streams are accompanied by metadata for use in performing fast forward and/or rewind operations during display at the client.

PCT patent publication WO 2004/025405, to Boyce Jill et al, filed Sep. 10, 2003, the disclosure of which is incorporated herein by reference, describes a video on demand server which includes separate stream multiplexers and a central statistical multiplexer.

U.S. Pat. No. 5,847,760 to Elmaliach et al., the disclosure of which is incorporated herein by reference, describes a variable bandwidth transmission system for broadcasting compressed video signals in which an encoder encodes each video frame (including a plurality of groups of pictures) at a maximal bit rate, half the maximal bit rate and at a quarter of the maximal bit rate. A transmitter controller selects which encoding is used according to available bandwidth. U.S. Pat. No. 6,674,796 to Haskell et al., the disclosure of which is incorporated herein by reference, describes a preliminary encoder which compresses video streams and during the compression generates encoding results, such as optimal motion vectors and inter/intra decisions. Encoders of a statistical multiplexer use the generated encoding results in the encoding of the video streams.

SUMMARY OF THE INVENTION

An aspect of some embodiments of the present invention relates to performing statistical multiplexing of multimedia (e.g., digital and/or audio) streams or files, onto a plurality of communication channels, at least partially by selection from interchangeable blocks generated for a single multimedia stream or file, for the plurality of communication links.

In some embodiments of the invention, a statistical multiplexer receives, for at least one or more sub-portions of the multiplexed streams, a plurality of interchangeable data blocks having different compression levels. Whenever a plurality of interchangeable blocks are received, the statistical multiplexer selects one of the blocks to be included in the stream, according to the capacity of a channel (or channels) onto which the stream is forwarded and the current utilization of the channel. Receiving already processed interchangeable blocks allows for fast operation of the statistical multiplexers and optionally allows performing the compression by a single pre-processing unit (or relatively few pre-processing units) instead of by a large number of multiplexers.

In some embodiments of the invention, the interchangeable blocks are received by the statistical multiplexer as a video stream formed of data blocks, together with replacement blocks not belonging to the video stream. Optionally, the replacement blocks include compressed versions (or more strongly compressed versions) of the blocks in the stream. Alternatively or additionally, at least some of the replacement blocks include larger (less compressed) blocks than the respective blocks in the stream.

The replacement blocks are optionally received together with the video stream from a same source. Thus, the replacement blocks are not stored by the statistical multiplexer before the video stream is received for statistical multiplexing and there is no need for large storage capacity in the statistical multiplexers. Alternatively, the replacement blocks are received on a different channel than the video stream. Optionally, in accordance with this alternative, the replacement blocks are received after the video stream, for example in response to requests of the statistical multiplexer.

In some embodiments of the invention, at most a single replacement object is generated for each sub-portion of the stream, corresponding to a time and/or spatial segment of the stream. In other words, each sub-portion of the video stream is represented in these embodiments, by at most one interchangeable blocks. In other embodiments of the invention, a plurality of replacement objects are generated for at least one of the sub-portions. The plurality of replacement objects optionally differ in their level of compression, resulting in different object sizes.

In some embodiments of the invention, the multiplexer performs on the average a relatively large number of replacements of blocks in the video stream, for example at least 50, 100 or even 500 blocks on the average, every minute. In an exemplary embodiment of the invention, the multiplexer performs each minute, on the average, more than a thousand or even 3000 block replacements, for a single video stream.

Alternatively to receiving a stream and replacement blocks, the statistical multiplexer receives a plurality of interchangeable blocks, none of which are organized into a stream, and generates from a sub-group of the received blocks a video stream of a desired size or rate.

In some embodiments of the invention, the interchangeable blocks are generated, in what is referred to herein as a preprocessing stage, before any block representations of the video data they represent are received by the statistical multiplexer for real-time multiplexing. Optionally, the interchangeable blocks are generated well before the statistical multiplexing is carried out, for example at least an hour before the statistical multiplexing. In some embodiments of the invention, the interchangeable blocks are used in statistical multiplexing onto a plurality of communication channels at a plurality of different times. Optionally, in some embodiments, at least some of the interchangeable blocks are stored by a storage unit before they are provided to one or more of the statistical multiplexers.

In other embodiments of the invention, the interchangeable blocks are generated in real time, within up to a few seconds before the video stream is displayed to the clients.

The interchangeable blocks are optionally generated by a different entity (e.g., located in a different housing) than the statistical multiplexer. In some embodiments of the invention, a preprocessing unit generating the blocks is located remote from a statistical multiplexer that uses the interchangeable blocks, for example distanced by more than at least 2, 10 or even 30 meters. Optionally, the statistical multiplexer is distanced from the preprocessing unit by at least 50 or even 100 meters. The preprocessed blocks are optionally stored by the preprocessing unit until the stream is requested by a client.

The preprocessing stage is optionally performed by a single preprocessing unit, for a plurality of statistical multiplexers, optionally even for hundreds or thousands of statistical multiplexers. Performing the preprocessing in a different (e.g., central) location from the location of the statistical multiplexing, allows performing the generation of the replacement blocks once for a plurality of statistical multiplexers, while each local multiplexer performs a local compression based on its local channel conditions. In addition, in some embodiments of the invention, the same data is transmitted from the preprocessing unit to the multiplexers, for example, on a shared communication channel (e.g., on an IP multicast channel), and there is no need to transmit separate streams to each of the multiplexers.

In some embodiments of the invention, the interchangeable blocks are transmitted to the statistical multiplexers over a local area network (LAN) or a wide area network (WAN). Optionally, the interchangeable blocks are transmitted to at least one of the statistical multiplexers over a wireless link, for example a satellite communication link. Alternatively or additionally, the interchangeable blocks are transmitted to the statistical multiplexer using a packet based protocol, such as the IP protocol and/or the Ethernet protocol.

In some embodiments of the invention, the replacement is performed in a video representation protocol layer, optionally a compressed video protocol layer (e.g., ITU-T H.262, ITU-T H.264, Windows Media 9 coding, SMPTE VC-9). The video blocks are optionally transmitted to the statistical multiplexer in the video protocol layer, without transport layer encapsulation. The statistical multiplexer optionally generates a video stream from the interchangeable blocks it receives, according to the capacity of the channel it controls and then performs on the generated video stream lower (e.g., transport) layer processing. The lower layer processing includes, for example, encapsulating the video blocks into data packets of a lower layer transport protocol, such as ITU-T H.222.0 Packetized Elementary Stream (PES) or ITU-T H.222.0 Transport Stream (TS). Alternatively or additionally, the statistical multiplexer receives at least some of the video blocks encapsulated by a lower layer protocol. For example, the statistical multiplexer may receive a video stream encapsulated by a lower layer protocol together with replacement blocks in a video protocol layer, without transport layer encapsulation. When replacement is required, the statistical multiplexer removes the lower layer encapsulation, performs the replacement and re-encapsulates the video stream.

Alternatively or additionally, the replacement is performed in a video transport protocol layer. Performing the replacement in the transport protocol layer makes the replacement a very simple and fast procedure, which requires nearly no processing resources. In the transport protocol layer, the replacement relates to complete transport unit blocks, requiring nearly no adaptation due to the replacement.

In some embodiments of the invention, the interchangeable video blocks comprise one or more complete media units of an underlying multimedia protocol, such as one or more video frames, slices and/or macro-blocks. Alternatively or additionally, the video blocks include one or more complete transmission units, such as MPEG-2 TS packets.

The interchangeable blocks are optionally such that their replacement is seamless and does not include repetition of video content twice or skipping of video content.

The interchangeable blocks are optionally generated in a variable manner, such that different numbers of interchangeable blocks are generated for different portions of a preprocessed video media. This allows better utilization of the bandwidth of the communication channels in the statistical multiplexers, while not requiring too much additional storage, preprocessing resources and/or bandwidth between the preprocessing unit and the statistical multiplexer.

In some embodiments of the invention, a plurality of interchangeable blocks are generated only for some sub-portions of the video media, while other portions are represented only by a single block. For example, a plurality of interchangeable blocks may be generated only for B-frames, possibly only for some of the B-frames (e.g., less than 80% of the B-frames).

Alternatively or additionally, the interchangeable blocks are generated for sub-portions of different sizes. Optionally, some interchangeable blocks represent a frame, while other interchangeable blocks represent less than a frame or more than a frame.

Further alternatively or additionally, some sub-portions have more interchangeable blocks than other sub-portions.

Further alternatively or additionally, the relative sizes of the interchangeable blocks of different sub-portions are different. For example, some sub-portions may have compressed blocks having a size which is about 60% of an uncompressed block, while other sub-portions have compressed blocks which have a size of 50% of the uncompressed blocks.

In some embodiments of the invention, the preprocessing of the video media enlarges the video media by less than 60%, 50%, 40% or even less than 30%. Optionally, the preprocessing adds to the bit rate of the video media less than 25%, less than 20% or even no more than 10%. In an exemplary embodiment of the invention, interchangeable blocks are generated only for about 50% of the bit stream (e.g., only for B-frames) and the interchangeable blocks include an original data block and a replacement block of half the size. Thus, the addition to the video media is 25%.

In an exemplary embodiment of the invention, interchangeable blocks are generated for a variable bit rate video media only when the temporal bit rate of the video media exceeds a predetermined threshold (and therefore may need to be compressed by the statistical multiplexer).

The interchangeable blocks optionally represent video data of up to about 5 seconds, optionally no more than 1 or even 0.5 seconds. In some embodiments of the invention, replacement blocks include data of a single time point (e.g., relating to a single image or portion of a single image). Alternatively, interchangeable blocks with images of longer time spans (e.g., greater than 10 seconds) are used.

An aspect of some embodiments of the invention relates to performing statistical multiplexing at least partially by selection from interchangeable blocks at least some of which have a size of at most a single frame. The term frame refers herein to a single picture from a video stream. In some embodiments of the invention, at least some of the interchangeable blocks are smaller than a single frame or even smaller than half a frame. In an exemplary embodiment of the invention, at least some of the interchangeable blocks are smaller than a tenth of a frame. Using such a small granularity achieves a higher multiplexed quality.

An aspect of some embodiments of the invention relates to transmission of meta-data describing the structure of a data entity (e.g., a video stream) to a statistical multiplexer, which supplies the video stream to one or more clients. The meta-data is used by the statistical multiplexer in fitting the video stream onto a telecommunication channel controlled by the multiplexer, thus simplifying and speeding up the statistical multiplexing.

Optionally, the meta-data is transmitted to the statistical multiplexer simultaneously with the video stream, for example on a same communication channel. Alternatively, the meta-data is transmitted to the multiplexer before the video stream and is optionally used in receiving the video stream or blocks from which the video stream is reconstructed.

In some embodiments of the invention, the meta-data identifies replaceable blocks within the video stream and the blocks that can be used for their replacement. Optionally, the meta-data states the sizes of the replaceable blocks and their corresponding replacement blocks. The meta-data optionally also includes access information (e.g., pointers) to the replacement blocks. Alternatively or additionally, the meta data includes timing and/or size information for sub-portions of the data entity.

In some embodiments of the invention, the statistical multiplexing is performed without relation to the content of the interchangeable blocks. Alternatively, the statistical multiplexer receives, for example in the meta-data, information on the importance of each sub-portion of the stream, and uses this information in determining which stream to compress and to what extent. For example, ads may receive different handling than movie content.

An aspect of some embodiments of the invention relates to performing statistical multiplexing of a channel, by software running on a processor not designed specifically for statistical multiplexing (e.g., not including a dedicated ASIC or FPGA).

While performing the statistical multiplexing in hardware is faster, and therefore hardware was used here-to-forth, the use of software is cheaper and therefore is considered worthwhile although being slower. In some embodiments of the invention, the software statistical multiplexing is used for communication links of relatively limited capacity. Alternatively or additionally, software is used for statistical multiplexing which is primarily performed by selection from interchangeable blocks.

An aspect of some embodiments of the invention relates to a statistical multiplexer (hardware, firmware and/or software based) which operates at a throughput of at least 10 Gbits per second per standard rack unit (19 inch×1.75 inch) of the statistical multiplexer. Optionally, the statistical multiplexer even has a throughput of at least 50 Gbits, 80 Gbits or even 100 Gbits per second per rack unit. These high throughputs are optionally achieved by simplifying the statistical multiplexing, for example by implementing at least some of the statistical multiplexing using block selection from interchangeable blocks prepared in advance.

The statistical multiplexing performed by the software includes receiving data representing a video channel and generating a standard video representation of the channel at a size that fits on the channel, optionally with other data that needs to pass on the channel. The received data may be in a standard video representation or may be in a proprietary format.

In some embodiments of the invention, the statistical multiplexing is achieved at a throughput of at least 1, 5 or even 10 Gbits per second per processor.

An aspect of some embodiments of the invention relates to statistical multiplexing by a Video on demand (VoD) server (e.g., VoD pump) or by a digital subscriber line access multiplexer (DSLAM).

There is therefore provided in accordance with an exemplary embodiment of the invention, a method of distributed statistical multiplexing of video data, comprising generating a plurality of blocks forming a pre-processed video media corresponding to an original video media, the plurality of blocks including, for one or more sub-portions of the original video media, a plurality of interchangeable blocks that represent the sub-portion, transmitting at least some of the blocks to a multiplexer and reconstructing the video media by the multiplexer, from at least some of the transmitted blocks.

Optionally, generating the pre-processed video media comprises generating a pre-processed video stream and a plurality of replacement blocks for one or more sub-portions of the video stream and wherein transmitting the at least some of the blocks comprises transmitting the video stream and at least some of the replacement blocks. Optionally, at least one of the replacement blocks is greater in size than its corresponding sub-portion of the video stream. Alternatively or additionally, at least one of the replacement blocks is smaller in size than its corresponding sub-portion of the video stream. Optionally, pre-processing the original video media comprises generating for at least one sub-portion, at least three interchangeable blocks. Optionally, pre-processing the original video media comprises generating a plurality of blocks for at least some sub-portions of the original video media and only a single block for one or more other sub-portions.

Optionally, pre-processing the original video media comprises selecting sub-portions for which a plurality of blocks are generated responsive to the types of frames to which the sub-portions belong. Optionally, pre-processing the original video media comprises selecting sub-portions for which a plurality of blocks are generated responsive to the locations within a group of pictures GOP of frames to which the sub-portions belong.

Optionally, pre-processing the video media comprises selecting sub-portions for which a plurality of blocks are generated responsive to the pixel values of the frames to which the sub-portions belong. Optionally, pre-processing the video media comprises selecting sub-portions for which a plurality of blocks are generated responsive to the extent of change in the sub-portion relative to neighboring images in the video stream. Optionally, pre-processing the video media comprises selecting sub-portions for which a plurality of blocks are generated responsive to the complexity of the images in the vicinity of the sub-portion in the video stream. Optionally, transmitting at least some of the blocks to a multiplexer comprises transmitting all the generated blocks to the multiplexer. Alternatively or additionally, transmitting at least some of the blocks to a multiplexer comprises transmitting fewer than all the generated blocks to the multiplexer and/or retrieving the blocks selectively by the multiplexer.

Optionally, transmitting at least some of the blocks to a multiplexer comprises fetching only blocks required by the multiplexer. Optionally, the method includes transmitting a metadata description of the generated blocks to the multiplexer and fetching by the multiplexer based on the metadata. Optionally, fetching the required blocks comprises fetching responsive to the current capacity and load on a channel controlled by the multiplexer. Optionally, pre-processing the original video media comprises generating a plurality of blocks, and storing the blocks in a plurality of separate files. Optionally, transmitting at least some of the blocks to a multiplexer comprises pushing the blocks by a transmitter, to the multiplexer.

Optionally, transmitting at least some of the blocks to a multiplexer comprises transmitting all the transmitted blocks of the video media on a single channel. Alternatively, transmitting at least some of the blocks to a multiplexer comprises transmitting the transmitted blocks of the video media on a plurality of channels. Optionally, transmitting at least some of the blocks to a multiplexer comprises transmitting at least some of the transmitted blocks over a Local Area Network LAN and/or over a Wide Area Network WAN or a Metropolitan Area Network MAN. Optionally, reconstructing the video media comprises reconstructing responsive to the current available bandwidth of a channel onto which the video media is forwarded and an amount of data, other than the video media, to be forwarded on the channel.

Optionally, transmitting at least some of the blocks to a multiplexer comprises transmitting all the transmitted blocks from a same source. Optionally, transmitting at least some of the blocks to a multiplexer comprises transmitting the transmitted blocks from a plurality of separate sources. Optionally, all the blocks are generated before any of the blocks is transmitted to the multiplexer.

Optionally, transmitting at least some of the blocks to a multiplexer comprises transmitting over a distance of at least 50 meters. Optionally, transmitting at least some of the blocks to a multiplexer comprises transmitting at least some of the blocks to at least five different multiplexers. Optionally, transmitting at least some of the blocks to a multiplexer comprises transmitting the same blocks to a group of multiplexers, in a geographical location or distribution network that includes a plurality of multiplexers. Optionally, transmitting at least some of the blocks to a multiplexer comprises transmitting different subsets of blocks representing the original video media to different multiplexers. Optionally, the blocks are generated in real time, less than five minutes before their transmission. Optionally, the blocks are generated in real time, less than five minutes before the reconstruction of their respective sub-portion in the video media by the multiplexer. Optionally, the blocks are stored in one or more intermediate storage devices between the pre-processing and the transmission.

Optionally, the blocks are delivered from the intermediate storage in accordance with a storage access protocol. Optionally, the blocks are generated at least an hour before the reconstruction of the video media by the multiplexer. Optionally, the blocks that can be used interchangeably to represent a sub-portion represent the same image content, but have different sizes. Optionally, at least some of the blocks that can be used interchangeably to represent a sub-portion represent different image content. Optionally, the blocks that can be used interchangeably to represent a sub-portion comprise blocks of a compressed video protocol layer, without transport layer encapsulation. Optionally, the multiplexer receives at least some of the blocks without transport layer encapsulation and adds transport layer encapsulation to these blocks after reconstruction. Optionally, the multiplexer receives at least some of the blocks with transport layer encapsulation, removes the encapsulation, reconstructs the video media and then adds transport layer encapsulation to the blocks.

Optionally, at least some of the blocks that can be used interchangeably to represent a sub-portion comprise transport layer encapsulation.

Optionally, at least some of the sub-portions of the video media include image data from a plurality of media units and wherein for at least one sub-portion the data of at least one of the media units is the same for all the interchangeable blocks representing the sub-portion.

Optionally, at least some of the blocks include one or more whole image slices and/or one or more whole image macro-blocks. Optionally, at least some of the blocks are smaller than a group of frames. Optionally, at least some of the blocks include one or more whole images. Optionally, at least some of the blocks represent less than 5 seconds of video data. Optionally, each of the blocks represents less than 5 seconds of video data. Optionally, for at least one sub-portion, the blocks that can be used interchangeably to represent a sub-portion comprise at least one media unit identical in all the blocks and at least one media unit that represented differently in the blocks. Optionally, the blocks that can be used interchangeably to represent a sub-portion comprise at least some blocks with transport layer encapsulation and at least some blocks without transport layer encapsulation. Optionally, pre-processing the original video media comprises generating a plurality of blocks that are encrypted and a plurality of blocks that are not encrypted. Optionally, blocks of sub-portions having a plurality of interchangeable blocks are not encrypted. Optionally, pre-processing the original video media is performed utilizing both an unencrypted version of the video media and an encrypted version of the video media. Optionally, the blocks that can be used interchangeably are processed from the unencrypted copy of the video media. Optionally, the blocks that can be used interchangeably are selected such that they do not span over a crypto-period boundary of the encrypted video media. Optionally, substantially all the generated blocks are encrypted.

There is further provided in accordance with an exemplary embodiment of the invention, a video preprocessing unit, comprising an input interface for receiving video media, an output interface and a processor configured to receive a video media through the input interface, to generate a plurality of blocks forming the video media, the plurality of blocks including for one or more sub-portions of the video media a plurality of blocks that can be used interchangeably to represent the sub-portion, and to transmit at least some of the blocks through the output interface. Optionally, the processor is adapted to generate a metadata description of the generated blocks.

There is further provided in accordance with an exemplary embodiment of the invention, a statistical multiplexer, comprising an input interface, an output interface leading to a communication channel and a processor configured to receive for a video media, a plurality of blocks including for one or more sub-portions of the video media a plurality of blocks that can be used interchangeably to represent the sub-portion, to select for each sub-portion a single block to represent the sub-portion, and to reconstruct a video stream from the selected blocks.

There is further provided in accordance with an exemplary embodiment of the invention, a method of statistical multiplexing, comprising receiving a metadata record of a data entity, the metadata record describing a structure of the data entity, receiving blocks forming the data entity; and adjusting the bit rate or transmission timing of the data entity, utilizing information in the metadata record.

Optionally, the data entity comprises an audio media, a video media, a data file or data stream. Optionally, the metadata record identifies sub-portions of the data entity for which there are a plurality of interchangeable blocks. Optionally, the metadata record identifies the sizes of the interchangeable blocks. Optionally, the metadata record identifies the sizes of at least some of the blocks not included in the interchangeable blocks. Optionally, the metadata record identifies the relative quality of the interchangeable blocks. Optionally, adjusting the bit rate or transmission timing of the data entity comprises selecting one of the plurality of interchangeable blocks to represent a sub-portion. Optionally, the metadata record indicates decoding times for sub-portions of the data entity.

Optionally, the metadata record indicates fetching locations of portions of the data entity. Optionally, the metadata record indicates locations of sub-portions of the data entity relative to markers within the data entity. Optionally, receiving the blocks forming the data element comprises fetching required blocks based on information in the metadata. Optionally, receiving the blocks forming the data element comprises receiving the blocks together with the metadata. Optionally, adjusting the bit rate or transmission timing of the data entity comprises changing the size of one or more sub-portions of the data entity. Optionally, adjusting the bit rate or transmission timing of the data entity comprises changing the transmission time of one or more sub-portions of the data entity. Optionally, adjusting the bit rate of the data entity comprises controlling the transmission of the data entity onto a channel.

Optionally, the metadata record indicates decoding times of corresponding sub-portions of the blocks. Optionally, receiving the metadata comprises receiving each portion of the metadata at least five seconds before receiving the blocks described by the metadata. Optionally, the metadata record identifies relative locations of MPEG-2 Video picture header fields in the blocks. Optionally, the metadata record identifies the frame types of corresponding frames of the blocks. Optionally, the blocks comprise MPEG-2 blocks and wherein the metadata record identifies the relative locations of Program Clock Reference (PCR) entries of the blocks. Optionally, adjusting the bit rate or transmission timing of the data entity, utilizing information in the metadata record comprises completing utilization of information in the metadata record on at least some sub-portions of the data at least 10 seconds before receiving the data portion.

There is further provided in accordance with an exemplary embodiment of the invention, a method of generating a metadata record for a video media, comprising receiving a video media, generating, for one or more sub-portions of the record, a plurality of interchangeable blocks, which can be used interchangeably to represent the sub-portion in reconstructing the video media and generating a metadata record which identifies one or more attribute of each of the interchangeable blocks.

Optionally, generating the metadata record comprises identifying for each of the blocks a size of the block and/or a degradation score of the video media due to the compression of the sub-portion of the block.

There is further provided in accordance with an exemplary embodiment of the invention, a method of distributed statistical multiplexing of video data, comprising generating a plurality of blocks forming a pre-processed video media corresponding to an original video media, the plurality of blocks including, for one or more sub-portions of the original video media, a plurality of interchangeable blocks that represent the sub-portion, transmitting at least some of the blocks to at least one multiplexer; and reconstructing the video media by the at least one multiplexer, from at least some of the transmitted blocks, at least some of the blocks represent not more than a single frame of the video media. Optionally, at least some of the blocks represent less than a single frame of the video media.

There is further provided in accordance with an exemplary embodiment of the invention, a statistical multiplexer, comprising an input interface connected to a communication link, an output interface leading to one or more communication channels; and at least one processor configured in software to receive a video media, through the input interface and statistically multiplexing the video media onto the one or more communication channels, at a rate of at least 1 Gbps, per rack unit.

Optionally, the at least one processor is included within a single housing with a video on demand server. Optionally, the at least one processor is configured to operate as a video on demand server. Alternatively or additionally, the at least one processor is included within a single housing with a DSLAM. Optionally, the at least one processor shares one or more of a backplane bus, power source, memory storage unit, external communication interface and shared management with a VoD server or a DSLAM.

BRIEF DESCRIPTION OF FIGURES

Exemplary non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EMBODIMENTS

Figure 1:
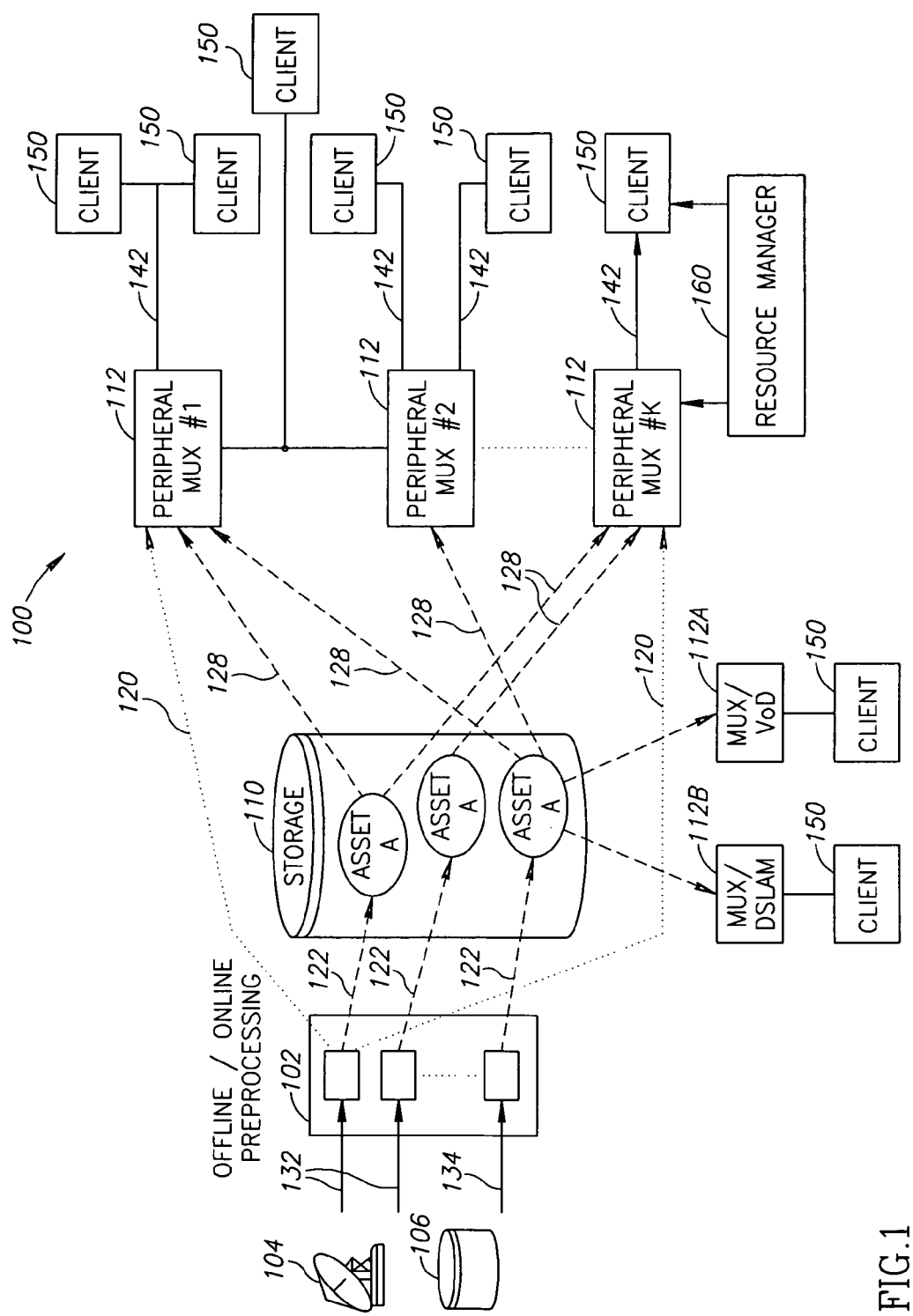
FIG. 1 is a schematic illustration of a video delivery system, in accordance with an exemplary embodiment of the invention.

FIG. 1 is a schematic illustration of a video delivery system 100, in accordance with an exemplary embodiment of the invention. System 100 includes a preprocessing unit 102 which receives video streams and prepares them for statistical multiplexing. In some embodiments of the invention, preprocessing unit 102 receives real time video streams 132, which are being transferred to clients 150. In an exemplary embodiment of the invention, clients 150 are home television sets connected through cable networks to video on demand (Vod) movie servers. The statistical multiplexing allows transmission of a larger number of video movies to clients 150, by lowering the bandwidth allocated to each video stream to an average value, rather than a maximal value.

The real time video streams may be received from substantially any source, including live production cameras (not shown) and broadcast sources (not shown) outside of system 100. The real time streams may be received through a satellite dish 104 or any other delivery network (e.g., Ethernet, optical fiber). Alternatively or additionally to receiving real time video streams 132, preprocessing unit 102 receives video files 134 from a storage unit, such as a video movie bank 106.

Preprocessing unit 102 performs preliminary compression on the video streams 132 and/or files 134 it receives. Real time preprocessed streams 120 are passed directly to peripheral statistical multiplexers 112, which transfer the video streams to clients 150. The resultant preprocessed streams from preprocessing unit 102 are optionally provided to multiplexers 112 with replacement objects, as explained hereinbelow in detail. A preprocessed stream and its replacement objects are referred to together as a preprocessed video media.

Non real-time video streams 122 (e.g., prestored movies for video on demand) handled by preprocessing unit 102 are optionally passed for storage to an intermediate storage unit 110. Alternatively, the preprocessed video streams are returned to video movie bank 106 for further storage, and are transported directly to the multiplexer 112, on demand, i.e., the tasks of intermediate storage unit 110 and video movie bank 106 are carried out by the same entity. Although only a single storage unit 110 is shown, system 100 may include many storage units 110 which host different preprocessed video streams. Alternatively or additionally, the different storage units 110 store different portions of a single video media, in order to allow faster fetching of the video stream. Further alternatively or additionally, at least some of the video media are stored on a plurality of storage units 110 for performance and/or redundancy purposes. The different copies of the video media may be identical or may differ in the pre-processing level they underwent.

Each statistical multiplexer 112 optionally controls the flow of signals on one or more communication channels 142 leading to clients 150. For each communication channel 142, peripheral multiplexers 112 statistically multiplex the preprocessed streams 120 and 122 (which upon retrieval are marked 128), so as to fit into the communication channel 142 leading to the client (or clients), as described below with reference to FIG. 5. In some embodiments of the invention, a plurality of statistical multiplexers 112 mutually feed a single communication channel 142 leading to clients 150, each statistical multiplexer controlling a portion of the signals that flow to the communication channel.

In operation, each multiplexer 112 optionally receives requests for video streams from the clients 150 it services, from a resource manager 160 and/or in any other way. Multiplexer 112 retrieves preprocessed versions of the requested video streams from storage unit 110 and/or receives real time preprocessed video streams 120 from preprocessing unit 102. When a non real time video stream 122 is requested by a client 150, a peripheral multiplexer 112 servicing the client retrieves the corresponding preprocessed video stream 128, when available, from storage unit 110. When not available in storage unit 110, the requested video stream is optionally retrieved from its source (e.g., bank 106) through preprocessing unit 102 and handled as if it is a real time video stream. Alternatively or additionally, one or more video streams 122 may be supplied directly to multiplexers 112, without undergoing preprocessing. Multiplexers 112 statistically multiplex such streams, which were not preprocessed in accordance with an embodiment of the invention, using any methods known in the art.

Multiplexer 112 optionally receives the preprocessed video streams 120 and 128 using any transmission method known in the art, including streaming, in which multiplexer 112 is passive, and fetching, in which multiplexer 112 actively requests the portions of the stream. Optionally, statistical multiplexers 112 are notified by resource manager 160 when they are to handle an additional stream and/or when a stream they are handling and/or have handled is terminated. Alternatively, multiplexers 112 detect when streams end or begin, using any method known in the art.

Multiplexer 112 optionally has a limited storage space, performing the statistical multiplexing in real time, based on data streamed from storage unit 110. Alternatively, multiplexer 112 has a large storage space, for example for storing the replacement objects of a large portion of a video stream or even of all the replacement objects of a video stream.

Communication channels 142 may include substantially any type of telecommunication channel, such as, for example, an HFC network QAM channel, a copper DSL line (e.g., ADSL) or a shared backbone of an FTTP PON.

Figure 2:
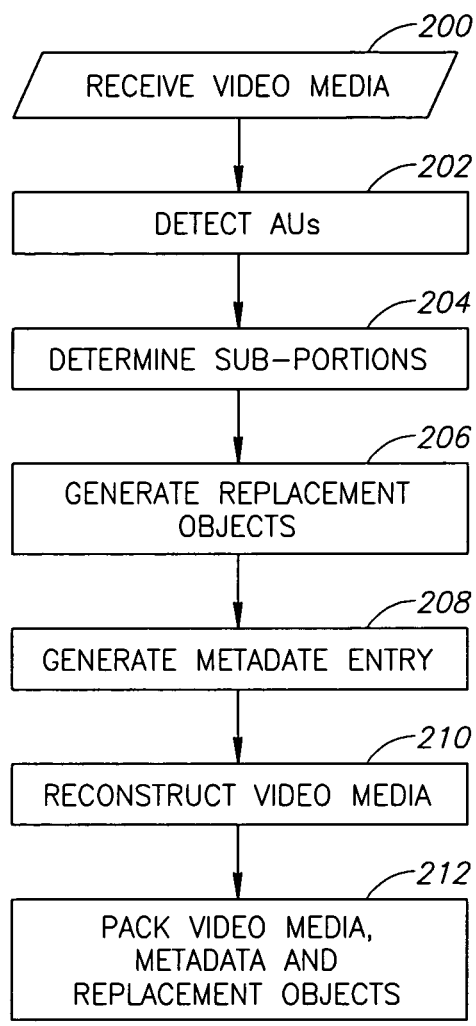
FIG. 2 is a flowchart of acts performed by a preprocessing unit in preparing a video stream for compression, in accordance with an exemplary embodiment of the invention.

FIG. 2 is a flowchart of acts performed by preprocessing unit 102 in preparing a video stream for statistical multiplexing, in accordance with an exemplary embodiment of the invention. Preprocessing unit 102 receives (200) the video stream (or other video media, e.g., a video file) and detects (202) video presentation units, referred to herein as access units AU, in the stream. The access units (AUs) are optionally coded representations that correspond to a single decoded picture of the video stream. In some embodiments of the invention, the access units include video frames accompanied by timing information, such as described in the ITU-T H.222.0 recommendation. For each access unit, preprocessing unit 102 determines (204) whether replacement objects should be generated for one or more media units or sequences of media units of the access unit. Media units or sequences of media units for which replacement objects were determined (204) to be generated are referred to herein as replaceable sub-portions. For each of the replaceable sub-portions, one or more compressed replacement objects are generated (206). A metadata entry is generated (208) for the access unit, listing, for example, block size and timing information for the access unit, for its replaceable sub-portions (if any) and/or for the replacement objects generated for the replaceable sub-portions.

In some embodiments of the invention, the video stream supplied to multiplexer 112 remains, during the preprocessing, substantially as it was received, without changes. In other embodiments of the invention, the video stream is reconstructed (210), as discussed in detail below. In still other embodiments of the invention, the video stream is not supplied to multiplexers 112 as a video stream, per se, but rather, a plurality of blocks, from which the multiplexer chooses the blocks it needs in order to reconstruct the video stream, are provided to the multiplexers. The term interchangeable blocks is used to encompass blocks representing the same sub-portion in any of these cases, including both cases in which a stream and replacement blocks are provided and cases in which a stream is not provided to multiplexers 112.

The video stream and the metadata, are optionally packaged (212) together with the replacement objects for delivery to peripheral multiplexers 112. In real time preprocessing of a video stream, the packaged data is transferred according to the timing constraints of the real-time transmission, to its destination (e.g., peripheral multiplexers 112 designated to receive the video stream or a storage unit designated to have the stream available for download within a predetermined time from its reception). In non real time preprocessing, the packaged data is optionally stored in intermediate storage unit 110. The packaging (212) together of the video stream, metadata and replacement objects optionally includes simple concatenation without further compression or encoding. Alternatively, the packaging (212) includes compressing and/or encoding together of portions of the packaged data in order to reduce the volume of the preprocessed video media. Optionally, in this alternative, the encoding is relatively simple so as not to add to the processing burden of multiplexers 112.

Referring in detail to receiving (200) the video stream, in some embodiments of the invention, for example when the preprocessing is performed in real-time, the video stream is streamed to preprocessing unit 102 at a predetermined rate and/or according to any other multicast or streaming rules. Alternatively, the preprocessing unit 102 fetches the video stream.

In some embodiments of the invention, the video stream is received with low protocol layer encapsulation (e.g., MPEG-2 transport stream (TS) packets), optionally in a legal format in which the stream is provided to clients 150. In some embodiments of the invention, the replacement objects and the replaceable sub-portions do not include low layer encapsulation. Pre-processing unit 102 optionally removes the low layer encapsulation, before proceeding with the pre-processing. Alternatively, the video stream is received by pre-processing unit 102 without low layer encapsulation. In other embodiments of the invention, discussed below with reference to FIG. 6, the replacement objects and the replaceable sub-portions include low layer encapsulation. Further alternatively, interchangeable blocks of some sub-portions are generated with low layer encapsulation, while interchangeable blocks of other sub-portions are generated without low layer encapsulation. For example, interchangeable blocks of sub-portions of the size of a complete frame are generated with low layer encapsulation, while interchangeable blocks of smaller sub-portions are generated without low layer encapsulation.

Figure 3:
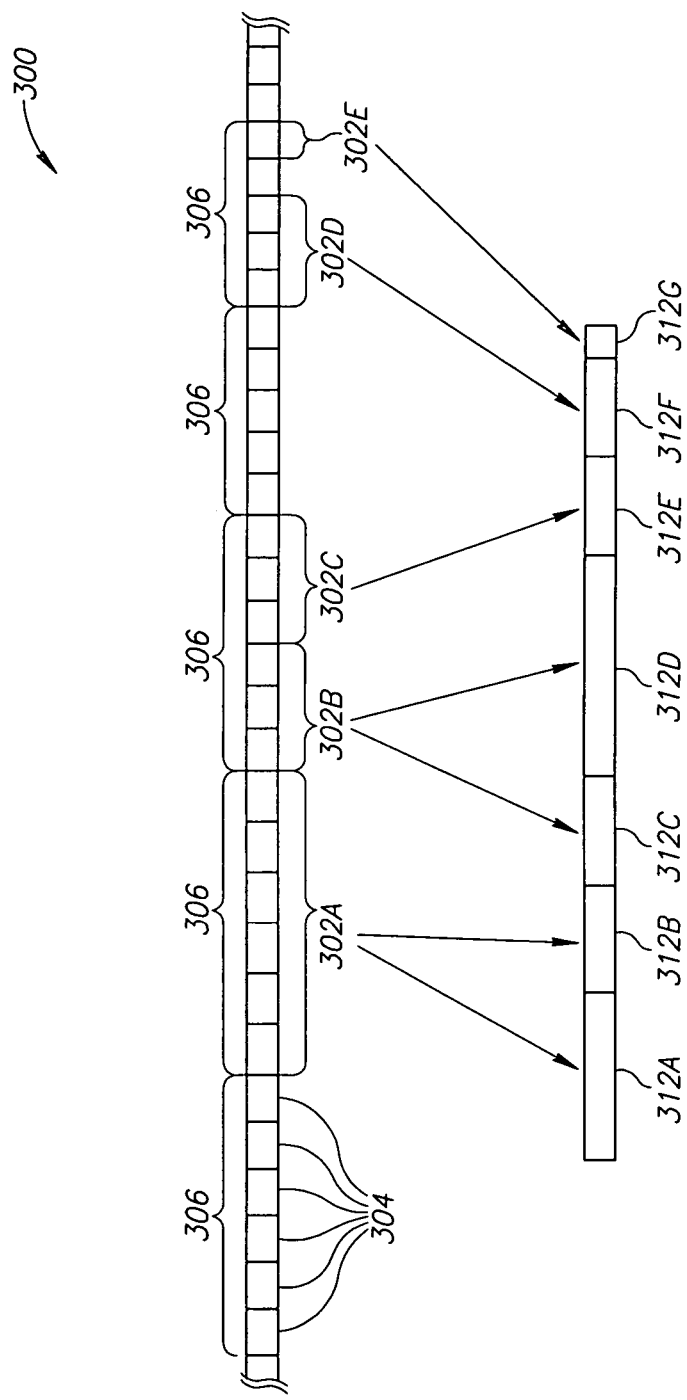
FIG. 3 is a schematic illustration of a portion of a video stream, with identified replaceable sub-portions, in accordance with an exemplary embodiment of the invention.

FIG. 3 is a schematic illustration of a portion of a video stream 300, with identified replaceable sub-portions 302 (marked 302A, 302B, 302C, etc.), in accordance with an exemplary embodiment of the invention. Video stream 300 is formed of a sequence of access units 306, corresponding to frames of the video stream. Each access unit 306 is formed of smaller media units 304, which optionally serve as the smallest units to which the pre-processing relates separately. Media units 304 may be, for example, sequences of video slices, video slices (e.g., MPEG-2 video slices), sequences of 2-5 macro-blocks or even single macro-blocks. In some embodiments of the invention, each access unit 306 (e.g., video frame) is a single media unit 304.

The size of the media units 304 used is optionally selected as a compromise between using large media units 304 for simplicity and using small media units 304 which allow more flexibility. In FIG. 3, access units 306 are shown for simplicity of the figure as including between about 5-8 media units 304. It is noted, however, that the access units 306 may include substantially any number of media units, from 1 to thousands or even more, depending on how finely the AUs are divided to define the media units 304.

In some embodiments of the invention, replaceable sub-portions 302 all include a same number of media units 304. It is noted, however, that different media units 304 may be of different sizes, as is known in the art. Alternatively, as shown in FIG. 3, different sub-portions 302 may include different numbers of media units 304. The inclusion of different numbers of media units 304 provides more flexibility in performing the statistical multiplexing by multiplexers 112.

In some embodiments of the invention, all of media units 304 in some or all of access units 306, are included in sub-portions 302, thus providing maximal flexibility to the statistical multiplexing. Alternatively, only some of media units 304 are included in sub-portions 302, for example those media units 304 that can be compressed with relatively low degradation.

Sub-portions 302 may include a plurality of media units 304 or may include only a single media unit 304. In some embodiments of the invention, sub-portions 302 are always included in (or entirely include) an access unit 306. Alternatively, a sub-portion 302 may be relatively large and span over a plurality of access units 306. For example, a sub-portion 302 may include an entire group of pictures (GOP). Further alternatively or additionally, one or more sub-portions 302 may begin or end in the middle of an access unit 306. For example, a sub-portion 302 may be smaller than a single average access unit, but range over a border between two access units.

FIG. 3 further shows replacement objects 312 (numbered 312A, 312B, 312C, etc), generated for the replacement sub-portions 302. It is noted that replacement objects 312 and sub-portions 302 having the same letter do not necessarily correspond. For sub-portion 302A, two replacement objects 312A and 312B are shown, object 312B being more compressed than object 312A. For sub-portions 302B, 302D and 302E only a single replacement object is shown.

Referring in detail to determining (204) replaceable sub-portions 302 for which replacement objects 312 are generated, in some embodiments of the invention, the determination includes finding sub-portions which can be replaced seamlessly by compressed replacement objects in a manner which results in a syntactically legal stream that can be decoded by clients 150. In some embodiments of the invention, the determination of sub-portions takes into account scrambling and/or encryption of the video stream, such that if the sub-portion is replaced by a replacement object, the video stream can still be able to be unscrambled and decrypted.

In some embodiments of the invention, for simplicity, the media units 304 included in sub-portions 302 are selected according to a predetermined pattern. For example, for every five consecutive media units 304, three media units 304 are taken to form a sub-portion 302 and the remaining two media units are not included in a sub-portion 302.

In other embodiments of the invention, the media units 304 included in sub-portions 302 are selected in a manner which minimizes the quality degradation of the video stream, if compressed replacement blocks are to be used. An exemplary method for determining (204) replaceable sub-portions 302 is now described with reference to FIG. 4.

Figure 4:
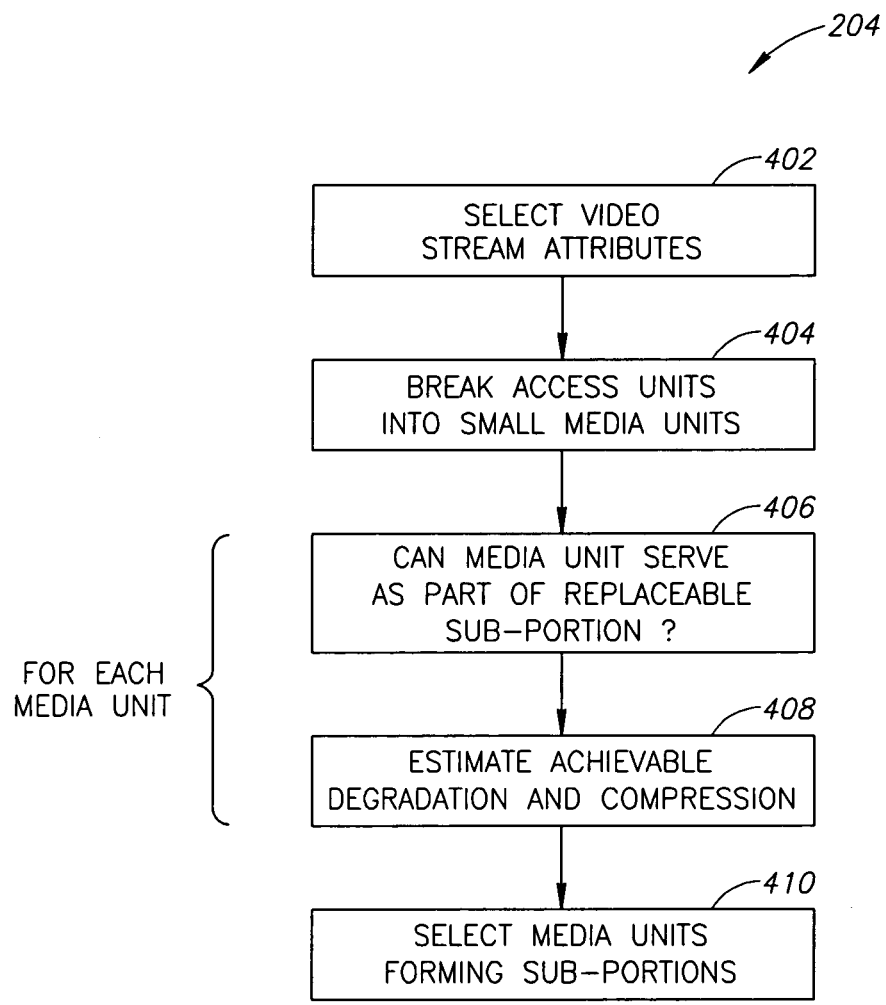
FIG. 4 is a flowchart of acts performed in determining replaceable sub-portions, in accordance with an exemplary embodiment of the invention.

FIG. 4 is a flowchart of acts performed in determining (204) replaceable sub-portions, in accordance with an exemplary embodiment of the invention. Desired attributes of the resultant video media and/or of the compression process are optionally selected (402), as discussed below.

Each access unit is optionally broken up (404) into smallest media units 304 to which the pre-processing relates. In some embodiments of the invention, for each smallest media unit 304, pre-processing unit 102 determines (406) whether the media unit can serve as a replaceable portion and/or estimates (408), or calculates, the quality degradation and/or compression which is achievable by replacement objects for the media units 304 and/or sequences of media units 304. Pre-processing unit 102 then selects (410) a required number of replaceable sub-portions meeting the selected (402) attributes.

In some embodiments of the invention, each media unit 304 is assigned a score indicative of its fitness to belong to replaceable sub-portion 302. Without loss of generality, higher scores are indicative of better fitness to be included in a sub-portion. Optionally, the score depends on the expected degradation due to replacement of the media unit 304 by a compressed version thereof. In some embodiments of the invention, the score depends on a gain ratio between the expected degradation and the compression gain. The gain ratio is optionally estimated for a predetermined compression ratio (e.g., 20%) or for a plurality of different compression ratios. Alternatively or additionally, the degradation is estimated based on the type of the frame to which the media unit belongs. Optionally, in accordance with this alternative, the score assigned to each media unit depends on whether the frame is a B-frame (bidirectional frame), a P-frame (predictive frame) or an I-frame (intra frame). B-frames are optionally given a highest score, as compression of the B-frames does not affect other frames of the stream, while I-frames are given a lowest score, as the I-frames affect all the frames in their group of pictures (GOP). Accordingly, most sub-portions 302 will be in B-frames and possibly P-frames and less commonly or not at all in I-frames. Alternatively or additionally, higher scores are assigned to media units 304 in frames toward the end of a group of pictures, as they affect fewer frames in the GOP.

Alternatively or additionally, the score that indicates fitness for being included in a replaceable sub-portion 302 depends on the video content (i.e., the pixel values) of the current video frame. Optionally, frames having a complex video content (i.e., high spatial activity) are given a low score. Alternatively or additionally, when the current video frame is substantially different from preceding or following video frames (i.e., the frame time locality has high temporal activity), a high fitness score is assigned to the media units 304 in the frame. In some embodiments of the invention, the score of each media unit 304 depends on the average luminance of the frame containing the media unit, for example giving a higher score to objects which are darker.

Alternatively to relating to an entire frame in determining the effect of the video content on the score, different portions of a single frame have scores that are affected differently according to their video content. For example, background areas of the frame may receive a first score, while detail areas of the same frame receive a second score different from the first.

The scores of the media units 304 optionally depend only on the media units themselves. Alternatively, the scores of the media units 304 are adjusted according to the scores of their neighboring media units, so that at least some of the replaceable sub-portions 302 will include a sequence of media units 304 rather than an isolated media unit 304. In some embodiments of the invention, the scores are allocated in a manner which gives preference to a media unit 304 being included in a sub-portion 302 if its neighbors are included in a sub-portion, so that at least some of the sub-portions are relatively large. Alternatively, higher scores are given to media units 304 whose neighbors have low scores, so that the replaceable sub-portions 302 (and hence the degradation they may cause to the video stream) are distributed over the video stream.

The media units 304 having a highest score are optionally included in sub-portions 302. In accordance with this option, different access units 306 have different percentages of media units 304 included in sub-portions 302, so that the best sub-portions 302 are chosen regardless of their density in access units 306. Alternatively, for each access unit 306 or group of access units 306, a predetermined number of media units 304 that have highest scores are included in sub-portions 302, so that the video stream can be easily reduced in size by the statistical multiplexer 112 at a fixed rate. In accordance with this alternative, the number of media units 304 that are included in sub-portions 302 in each access unit 306, is optionally substantially the same for all access units 306. Further alternatively or additionally, the number of media units 304 included in replaceable sub-portions 302 of an access unit 306 depends on the type of the frame of the access unit.

Non-neighboring selected media units 304 are optionally defined separately as sub-portions 302, while neighboring selected media units are optionally combined into large sub-portions. Alternatively, for each group of neighboring media units 304, pre-processing unit 102 determines whether it is better to combine them together into a single sub-portion 302 or to include them in a plurality of separate sub-portions 302, for example based on the selected (402) attribute values of the video stream.

Further alternatively or additionally, after a determination of which blocks are included in sub-portions 302 is performed for each media unit 304, the determinations are revisited based on the spatial and/or temporal distribution of the selected media units 304 in the access unit 306 or in a sequence of access units. For example, stand alone selected media units 304 determined to form sub-portions 302 may be replaced by non-selected media units 304 neighboring other selected media units 304. Alternatively, a plurality of scattered sub-portions 302 is preferred over one or more sub-portions 302 formed of more closely gathered media units 304, as a same compression rate causes more video quality degradation when consecutive media units 304 are compressed.

In an exemplary embodiment of the invention, for each access unit 306, a compression of up to 25% needs to be allowed for, while allowing also for lower (e.g., 10%, 20%) compression rates. In each access unit 306, slices which can achieve at least 30% compression while not exceeding a threshold degradation level, are selected (410) to be tentative replaceable sub-portions. About half the selected slices are used on their own as replaceable sub-portions, while the other half are combined together to form relatively large replaceable sub-portions.

Alternatively to breaking up (404) the access units into smallest media units 304, the determining (204) of replaceable sub-portions 302 is first performed for relatively large units (e.g., entire access units, slices). Only if the large units are determined to be unsuitable sub-portions 302, is a determination at a lower scale performed. Further alternatively or additionally, in some portions of the video stream, large media units are used, while in other portions of the video stream, smaller media units are used, for example depending on the picture complexity of the images of the video stream.

Optionally, the rules governing the identification of sub-portions 302 are substantially the same for all video streams. Alternatively, the rules governing the identification of sub-portions 302 are selected for each video stream separately, for example according to a quality rating of the video stream. For example, video streams having a high quality rating (e.g., video streams whose producers pay a premium for the video stream being supplied at a high quality) optionally have relatively small sub-portions 302 and/or replacement objects 312 of only slight compression, as the replacement required for these video streams will generally be limited.

In some embodiments of the invention, the determination (204) of replaceable sub-portions 302 is based on the current bit rate of the stream. For example, if the current bit rate of the stream is relatively high, larger replaceable sub-portions 302 are optionally chosen, sub-portions 302 are selected more frequently in the stream and/or the replacement objects 312 of the sub-portions 302 are generated with a relatively high compression rate.

Encryption

In some embodiments of the invention, the video stream is provided to clients 150 unencrypted. In other embodiments of the invention, the video stream is provided to preprocessing unit 102 partially encrypted. Sub-portions 302 for which replacement blocks are generated are optionally selected only from portions of the stream which are unencrypted. The encryption is optionally applied to a minimal percentage of the video stream, which is sufficient to prevent unauthorized utilization of the video, while allowing preprocessing unit 102 to perform the preprocessing without dealing with encrypted portions. In an exemplary embodiment of the invention, less than 30%, or even less than 20%, of the received stream is encrypted. In some embodiments of the invention, at least 5% or even at least 10% of the stream is encrypted.

In still other embodiments of the invention, pre-processing unit 102 receives the video stream in both an encrypted and a non-encrypted version. The pre-processing is performed on the non-encrypted version. In the resultant preprocessed video media, those portions for which replacement blocks are generated are included unencrypted, while portions for which replacement blocks are not generated are taken from the encrypted version. In determining (204) sub-portions 302, pre-processor 102 is optionally careful not to define sub-portions that span over a crypto-period (i.e., a time span over which a specific encryption key is authorized) border between different encryption code periods.

Alternatively or additionally, one or more of the interchangeable blocks of a single sub-portion are encrypted, while one or more other blocks are not encrypted. The encryption used in accordance with this alternative is optionally such that does not have a dependency between the encryption of neighboring blocks.

In still other embodiments of the invention, the encryption is performed after the pre-processing and before the preprocessed video media is provided to multiplexers 112. The same encryption key is used for all the interchangeable blocks of a single sub-portion, such that regardless of which block is provided to the client, the client will be able to decrypt the stream. Optionally, if the encryption is performed also on transport layer encapsulation of the video data, the sub-portions are selected as including only full encryption units.

Attribute Selection

In some embodiments of the invention, the attribute selection (402) is based on user configuration. Alternatively or additionally, the attribute selection (402) is performed responsive to feedback from multiplexers 112, as discussed in detail below. In some embodiments of the invention, the attributes of the video stream and/or of the compression process are adjusted dynamically, for example according to the type of video stream (e.g., sports, news, movie) and/or the number of viewers of the video stream.

The attributes selected (402) optionally include parameters of the selection of sub-portions and/or of generation of replacement objects 312. In some embodiments of the invention, the selected attributes include the bit rate range between a most compressed version of the video stream and a most expanded version of the video stream. In some embodiments of the invention, the selected attributes include a maximal allowed visual degradation of the resultant video stream. The selected attributes optionally also include a minimal and/or average size of replaceable sub-portions (e.g., at least 2 MPEG-2 video slices) and/or a desired distribution of replaceable sub-portions of different sizes. In some embodiments of the invention, the selected attributes of the video stream include the size of media units 304 to be used, the kind of the media units 304 (e.g., frame, slice, sequence of microblocks) and/or the average number of media units 304 to be included in sub-portions 302, in each access unit 306. The attributes optionally include whether it is desired to have the sub-portions 302 concentrated within access unit 306 or distributed within access unit 306.

Other attributes which are selected, in some embodiments of the invention, include a weighting scheme used in assigning scores to the access units 306 and/or media units 304 of the stream, the scores indicating the desirability of including sub-portions 302 in the access unit 306 and/or of including the media units 304 in replaceable sub-portions 302.

In some embodiments of the invention, real-time and non-real time pre-processing use the same processing attributes. Alternatively, real-time pre-processing uses attributes which are selected to meet the constraints of the available processing resources, while non-real time pre-processing uses attributes directed at achieving more optimal pre-processed video media, achieving better statistical multiplexing and/or less quality degradation. For example, in real time preprocessing, preprocessing unit 102 may make decisions based on shorter video stream portions and/or larger media units 304 may be used. In some embodiments of the invention, in real time processing, short cut heuristics are used in selecting best options to be used (e.g., selection of sub-portions), while in non real time pre-processing, exhaustive examination of the possibilities is optionally performed, when possible.

In real time pre-processing, the time from when multiplexer 112 is instructed to provide a video stream until client 150 begins to receive the stream is optionally shorter than 60 seconds or even shorter than 10 seconds. The time between preprocessing the real time stream and providing the stream to the client is optionally shorter than 5 seconds, or even shorter than 3 seconds. The time between receiving a sub-portion of a stream by multiplexer 112 and receiving the sub-portion by client 150 is optionally shorter than 1000 milliseconds or even shorter than 500 milliseconds. In some embodiments of the invention, the time between receiving a sub-portion of a stream by multiplexer 112 and receiving the sub-portion by client 150 is shorter than 100 milliseconds.

Referring in detail to generation (206) of the replacement objects, in some embodiments of the invention, the replacement objects represent the same media content as the original sub-portions. Optionally, the replacement objects are more compressed forms of the original sub-portions 302. Alternatively, one or more replacement objects include enhanced (i.e., less compressed) forms of the respective sub-portions in the resultant preprocessed stream, as discussed below. Alternatively or additionally, in some cases, the replacement objects represent different data than the replaceable sub-portions. For example, the replacement objects may include an apology notice and/or advertisements.

In some embodiments of the invention, the replacement objects (or more compressed sub-portions) are compressed from the respective sub-portions 302 using re-quantization of the DCT coefficients of the original video content of sub-portions 302. In some embodiments of the invention, open-loop re-quantization is used. In other embodiments of the invention, re-quantization is performed together with motion compensation. Alternatively, the compression performed includes full decoding and re-encoding of the sub-portions. Further alternatively, any other compression method which does not interfere with the decoding may be used.

Optionally, for each sub-portion 302, a single replacement object is generated. The compression ratio of the replacement object (or compressed sub-portions) relative to the original sub-portion is optionally selected according to the most probable required bandwidth reduction. Alternatively or additionally, the compression ratio used is the lowest lossy compression ratio which achieves a sufficient bit rate reduction if all the replaceable sub-portions 302 of the stream are replaced by their respective replacement objects. Further alternatively or additionally, the compression ratio used is that which achieves a best ratio between quality loss and bit rate saving. In some embodiments of the invention, all the replacement objects of a single video stream use substantially the same compression ratio. Alternatively, different compression ratios are used for different replacement objects of the same stream, in order to allow multiplexers 112 more flexibility.

Alternatively to generating a single replacement object for each sub portion 302, more than one replacement object is generated for some or all of sub-portions 302, in order to allow more flexibility to multiplexers 112. The number of replacement objects generated for a single sub-portion 302 is optionally selected based on a tradeoff between processing power required by preprocessing unit 102 and network bandwidth for transmission from preprocessing unit 102 to multiplexers 112, on the one hand, and video quality (e.g., finer bit rate regulation) and/or processing power of statistical multiplexers 112 on the other hand.

For example, for video streams not requiring real time preprocessing, more replacement objects may be generated than for real time streams. In some embodiments of the invention, the number of replacement objects generated also depends on the available storage capacity and/or storage costs.

In some embodiments of the invention, the number of replacement objects 312 generated for a single sub-portion 302 is user configurable. Alternatively or additionally, when the pre-processing is performed in real-time, the number of replacement objects for a single sub-portion 302 is adjusted dynamically based on feedback from multiplexers 112. For example, when a multiplexer 112 determines that it uses replacement objects substantially smaller than it needs (i.e., some of the bandwidth of its controlled channel 142 is not used), the multiplexer 112 sends a control message to preprocessing unit 102 requesting to increase the size of the replacement objects, by providing less compressed replacement objects. If requests are received from at least a predetermined number of multiplexers 112, preprocessing unit 102 automatically increases the number of replacement objects 312 it produces for at least some of sub-portions 302, when possible, thus allowing for more freedom in the statistical multiplexing. The number of generated replacement objects 312 is optionally decreased when control messages are not received from multiplexers 112.

The control messages are optionally transmitted from multiplexers 112 to preprocessing unit 102 through a resource management sub-system. Alternatively, any other method is used to provide the feedback.

Feedback from multiplexers 112 may determine other parameters of the generation of replacement objects 312 and/or the selection of sub-portions 302, such as the maximal (or minimal) compression ratio to be provided. Alternatively or additionally, feedback from multiplexers 112 determines other parameters of the generated replacement objects 312, such as the sizes of the sub-portions 302, an average spacing between sub-portions for which replacement objects are generated and/or a percentage of the video stream for which replacement objects are generated.

Metadata

Referring in detail to generating (208) a metadata entry for an access unit 306, in some embodiments of the invention, each metadata entry includes a decoding time stamp (DTS) of the access unit, which indicates the time at which the access unit is to be decoded by the client. The DTS is optionally taken from a header of a packet of the access unit 306. Optionally, the metadata entry also includes the size of the access unit 306, in the video stream 300, for example stated in bytes. The size optionally includes encapsulating protocol overhead, such as MPEG-2 transport stream packet overhead (e.g., headers, padding). In some embodiments of the invention, when the placement in the packets was not performed yet, the size is determined based on an estimate of the addition due to the placement in packets and/or the size is updated in the metadata after the placement in packets. Alternatively, the size stated for the access unit in the metadata includes only media unit portions and not encapsulation protocol data. Further alternatively, the metadata entry does not indicate the size, and the size is determined by multiplexers 112 in encapsulating the video data in packets and/or in performing the statistical multiplexing. In some embodiments of the invention, the sizes of access units 306 are added to the metadata by multiplexers 112.

In some embodiments of the invention, the metadata entry includes a pointer to the access unit in the pre-processed media. Optionally, when the pre-processed video media is provided in one or more files, the pointer includes an offset of the access unit in the file and when a plurality of files are used, an indication of the file. Alternatively or additionally, the pointer is stated relative to a fixed point in the video stream, such as a previous access unit 306 and/or a program clock reference (PCR), e.g., within a transport stream layer of the video data. Further alternatively, a pointer is not included, and the access unit is located, for example, based on its decoding time stamp (DTS). Optionally, in this alternative, the metadata entries of access units 306 states the DTS to which it relates and the DTS of a received packet is used to find the corresponding metadata entry. In some embodiments of the invention, the metadata entry includes a pointer to a sub-portion of the access unit, such as an MPEG-2 video picture header field (vbv_delay).

In some embodiments of the invention, the metadata entry includes other information on the access unit, which may be useful for statistical multiplexing by peripheral units 112, such as the type of the frame of the access unit (e.g., I-frame, P-frame, B-frame) and/or its relative location in a GOP. Alternatively or additionally, any other data which is useful in determining which sub-portions 302 are to be replaced is included in the metadata. For example, any of the information mentioned above as being used in determining which media units 304 should be included in replaceable sub-portions may be included in the metadata, to aid multiplexers 112 in determining which sub-portions should be replaced.

For each replaceable sub-portion 302 of the access unit 306, the metadata optionally includes an indication of the size of the replaceable sub-portion 302 and the sizes of the one or more replacement objects 312 generated therefor. Optionally, the metadata includes a pointer to the replaceable sub-portion 302 (e.g., an offset from the beginning of the access unit) and a pointer to each of the replacement objects 312. In some embodiments of the invention, the metadata includes for each of the replacement objects a quality score indicating the quality degradation or improvement of the replacement object 312 relative to the sub-portion 302. Alternatively or additionally, the metadata includes for each replacement object the compression ratio (i.e., the bandwidth saving) of the replacement object 312 relative to the sub-portion 302.

Reconstruction

Referring in detail to reconstructing (210) the video stream, in some embodiments of the invention, the reconstruction includes placing delimiters before and/or after replaceable sub-portions 302, so as to simplify their identification. The delimiters are optionally removed by multiplexers 112.

In some embodiments of the invention, some of the original sub-portions 302 are replaced by compressed versions, in order to reduce the default size of the video stream. Optionally, the replacement objects 312 are even more compressed versions of the original sub-portions 302. In accordance with this option, the original media units may simply be dropped. The more compressed replacement objects may be generated from the original sub-portion 302 or from the compressed version of the sub-portion. Alternatively or additionally, one or more of the sub-portions included in the preprocessed video stream is smaller than one or more of its corresponding replacement objects 312. In an exemplary embodiment of the invention, the original sub-portion 302 is included in the preprocessed video media as a replacement object 312. In these embodiments, multiplexers 112 may perform statistical multiplexing replacements if they find they have additional bandwidth which can be used to provide higher quality.

Referring in detail to packing (212) of the video stream with the replacement objects, in some embodiments of the invention, the packed data includes the original video stream together with the replacement data objects and the metadata. Alternatively, the metadata is packed separately and optionally provided separately.

In some embodiments of the invention, all the replacement objects of the video stream are packed into a single file. Alternatively, for example when multiplexers 112 selectively fetch the replacement objects (or interchangeable objects) they require, the objects of a single video stream are stored in a plurality of files. In an exemplary embodiment of the invention, for each replaceable sub-portion, the larger interchangeable block is stored in one file and the smaller block is stored in another file. This option is used, since usually if small blocks are required for one portion they will be required for its neighboring portion, as the available bandwidth on channel 142 for the video stream is probably limited. Alternatively, objects with a high chance of being fetched are stored in a first file and objects with a low chance of being fetched are stored in a second file.

In an exemplary embodiment of the invention, the data on I-frames is stored in a first file which is fetched in its entirety, if the stream is played in its entirety (e.g., not with a skip option). Further files are optionally used to store data on other frames for which there are a plurality of interchangeable blocks. In other embodiments of the invention, the video stream and replacement objects are provided substantially concurrently to the multiplexers although being stored in separate files or even in separate storage units. Further alternatively, any other storage format is used for the replacement objects. It is noted that some or all of the files used may be further split or combined according to their size and/or may be replicated for performance and distribution purposes.

In some embodiments of the invention, the media units are included in each file in a back to back arrangement, without separation between media units and/or without encapsulation. The back to back arrangement may be used, for example, when metadata of the video media provides pointers to the units of the video stream.

Preprocessing Alternatives

In some embodiments of the invention, pre-processing unit 102 performs, in parallel, pre-processing of real time and non-real-time video streams. The real-time video streams optionally receive preference in the utilization of the processing power of pre-processing unit 102. The processing power not utilized by the real time video streams is used in pre-processing the non-real-time video streams.

Alternatively to detecting (202) access units 306 as a basis for determining sub-portions and/or generating metadata entries for each access unit, other media units may be used, such as GOPs or slices. In some embodiments of the invention, the generation of the metadata is performed on units of a first granularity, and the determination of the sub-portions uses units of a second (e.g., finer) granularity as a basis. The units used as a basis for the determination of the sub-portions 302, generally prevent identification of sub-portions which span over the border between two basis units. In some embodiments of the invention, basis units are not used.

Statistical Multiplexing

Figure 5:
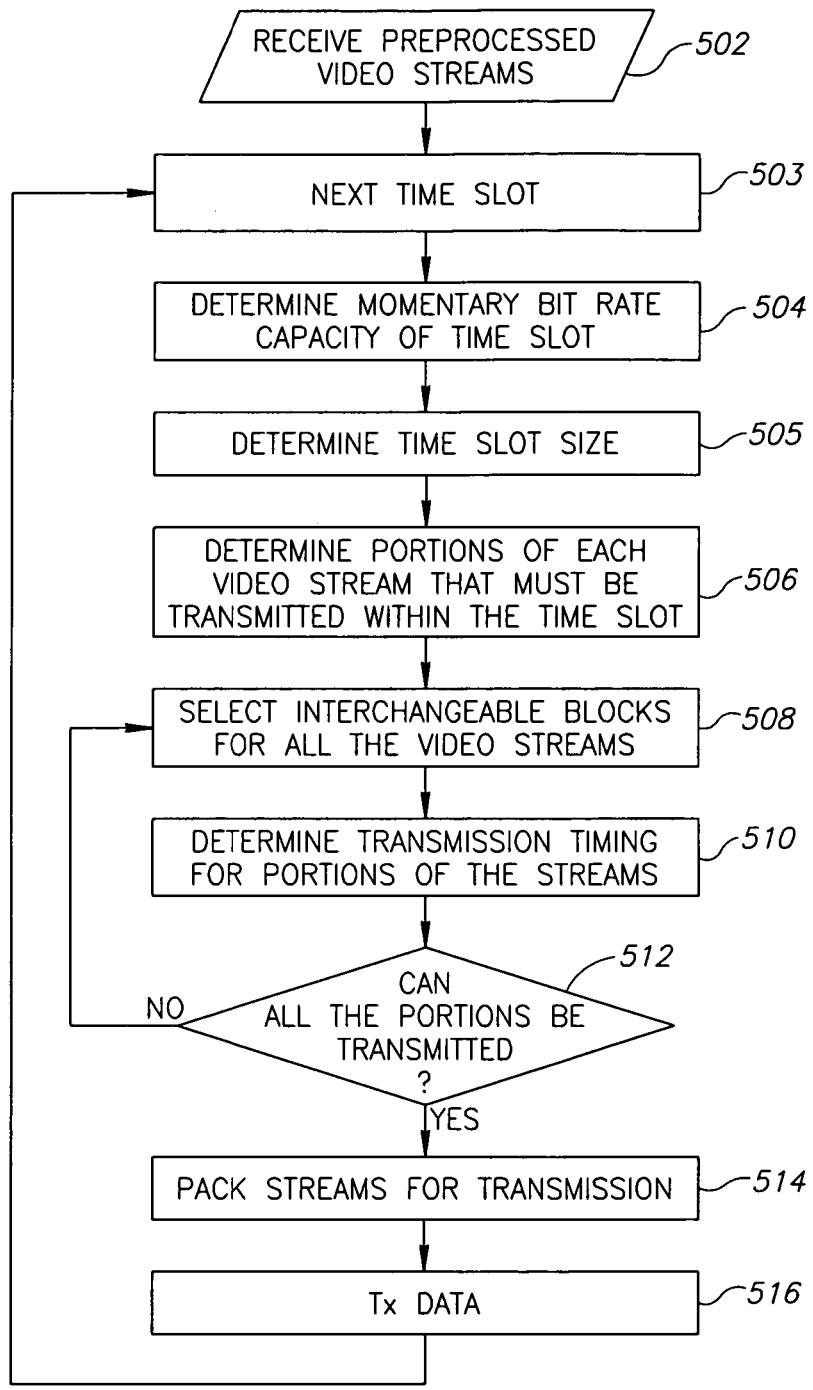
FIG. 5 is a flowchart of acts performed by a peripheral multiplexing unit, in accordance with an exemplary embodiment of the invention.

FIG. 5 is a flowchart of acts performed by a peripheral multiplexer 112, in accordance with an exemplary embodiment of the invention. Multiplexer 112 receives (502) the preprocessed video streams directed to clients 150 connected to the communication channel 142 it feeds. In each time slot cycle (503), the momentary bit rate capacity of communication channel 142 in the time slot is determined (504) and the bit capacity of the time slot is determined (505), as the product of the time slot length and the momentary bit rate of the channel. The portions of data from all the video streams and other data units (e.g., data files, audio media) that need to be transmitted in the current slot are determined (506). For each sub-portion that must be transmitted, an interchangeable block representing the sub-portion, is provisionally selected (508). Optionally, the interchangeable block currently belonging to the video stream is selected. The order of the portions in the current slot is optionally determined (510) in order to meet the timing and buffering constraints of the video streams. The determination (510) optionally includes preventing large bursts of data in a specific stream, and proper transmission of pieces of sub-portions in different time slots when required.

The total size of the selected portions is determined and compared (512) to the total bit capacity of the time slot. In addition it is optionally determined whether it was possible to determine (510) an order that meets the timing and buffering constraints of all the streams. If necessary, smaller (more compressed) interchangeable blocks are selected (508) in order to allow all the data portions to fit into the current slot (e.g., to the portion of the channel allocated to the stream) and/or in order to make more room for transmission of data portions earlier than they must be transmitted. If there is extra room, subsequent portions that may be transmitted in following slots are included in the current slot, in order to make room in more crowded slots.

The multiplexed streams are optionally encapsulated (514) for transmission in lower layer packets and are forwarded (516) to the clients 150. For example, with relation to MPEG-2 transport streams, the encapsulation in lower layer packets optionally involves re-stamping of the program clock reference (PCR) in the packets, and re-generation of program specific information (PSI).

In some embodiments of the invention, for example when the video stream is provided in real time, receiving (502) the video streams by multiplexers 112 is performed in a push mode in which the multiplexers 112 are passive. The video media are optionally provided in these embodiments under the control of preprocessing unit 102, for example using a streaming interface, such as a UDP/IP, TCP/IP or ATM interface. In other embodiments of the invention, for example in video on demand (VoD) applications, receiving (502) the video streams by multiplexers 112 is performed in a pull mode in which the multiplexers 112 actively fetch (read) the portions of the video streams and/or corresponding replacement objects. In some embodiments of the invention, the video stream, replacement blocks and/or metadata are fetched using a storage access protocol, such as the small computer system interface (SCSI), Internet SCSI (iSCSI), network file system (NFS), storage area network (SAN), network access server (NAS), integrated drive electronics (IDE), serial advanced technology attachment (SATA), fibre channel over IP (FCIP) or fibre channel protocols.

Optionally, the received (502) video streams include with them, on the same physical and/or virtual channel, the metadata and the replacement objects generated for them. This option allows for relatively simple provision of the video stream and associated data (e.g., metadata and replacement objects). Alternatively, to allow simpler handling by multiplexers 112, the video stream is transmitted on a separate physical and/or virtual channel from the metadata and/or the replacement objects. In an exemplary embodiment of the invention, the video stream, replacement objects and metadata are transmitted on separate UDP channels (i.e., using separate UDP port numbers), optionally on the same physical channel.

In some embodiments of the invention, the replacement objects 312 are received separately from the video stream, for example some or all of the replacement objects and/or the video stream are supplied to multiplexer 112 in advance. Alternatively or additionally, the metadata is first provided to multiplexers 112 in a pull or push mode. Multiplexers 112 then fetch the video stream and replacement portions 312 they need, using the metadata. Accordingly, in some embodiments of the invention, only the replacement portions 312 actually required by the multiplexer 112, are fetched. Alternatively, the required replacement portions are retrieved with their surroundings, for example, for disk access optimization. In some embodiments of the invention, portions of the video stream that are to be replaced are not fetched. The information in the meta-data is optionally used to determine in which file and/or through which physical channel or virtual channel (e.g., UDP port number) the objects are to be found.

In some embodiments of the invention, multiplexers 112 use the metadata in performing one or more of the tasks of the method of FIG. 5. The use of the metadata makes the operation of multiplexers 112 faster and more efficient, so that multiplexers 112 may require lower computational complexity. For example, in order to perform its tasks, multiplexer 112 optionally does not need to examine the video stream itself, for at least some of the frames of the video stream, as the timing and size information is included in the metadata. In some embodiments of the invention, multiplexer 112 may handle an entire video stream, including performing block replacements, without examining the contents of the stream. Optionally, the metadata includes pointers to the various sub-portions (e.g., replaceable and/or non-replaceable) of the video media. In addition, pointers included in the metadata may be used for fast locating of required replacement blocks, without requiring a search through a file including the replacement blocks.

It is noted that in addition to pre-processed (real time and/or non-real time) streams, multiplexers 112 may receive streams that were not pre-processed at all. Optionally, multiplexers 112 fit these streams into channels 142 without compressing them. Alternatively, multiplexers 112 perform complete on the fly compression (e.g., including decompression and recompression and/or requantization) of the streams that were not preprocessed in order to fit them onto channels 142, using statistical multiplexing methods known in the art. This option may be used, for example, when multiplexers 112 have available processing power. In some embodiments of the invention, multiplexers 112 may perform complete on the fly compression of pre-processed streams, for example when the pre-processing did not prepare sufficiently compressed replacement blocks and/or when the pre-processed streams do not provide for a desired compression ratio versus degradation compromise.

Referring in detail to determining (504) the capacity of the communication channel 142, in some embodiments of the invention, communication channel 142 has a predetermined capacity which is known to multiplexer 112. Alternatively, the capacity of communication channel 142 varies over time, for example due to changes in noise levels. Alternatively or additionally, channel 142 is a virtual channel with dynamically changing bandwidth.

In some embodiments of the invention, the available bandwidth of communication channel 142 for preprocessed video media, varies due to the amount of bandwidth on channel 142 used for communication of data not compressible (or otherwise reducible) by multiplexer 112. The non-compressible data may include video or audio streams that are not to be compressed and/or one or more data streams.

The total data size that needs to be transmitted is optionally determined by reviewing the access units of the video streams that need to be passed on the channel, for access units that must be transmitted in the current time slot. For example, all access units 306 that have a decoding time stamp (DTS) that expires within the time slot are considered as must being transmitted in the current time slot. Optionally, when there is momentarily available unused channel capacity, subsequent access units 306 or portions of access units expiring in following time slots are included in the current time slot. Optionally, if a portion of an access unit 306 was transmitted in a previous time slot, only the remaining portion of the access unit is transmitted in the current time slot.

Referring in detail to selecting (508) smaller interchangeable blocks, in some embodiments of the invention, the size reduction is performed by replacing one or more sub-portions 302 with a smaller replacement object 312. Alternatively or additionally, when a replacement object 312 is not available, sub-portions 302 are compressed by the multiplexer 112.

In some embodiments of the invention, the one or more video streams to be reduced in size and the extent to which each one is to be reduced in size are selected according to quality of service (QoS) ratings of the video streams, optionally assigned by a resource manager. For example, each video stream may be given a QoS rating according to the service level agreement of the client requesting the stream (e.g., the amount of money paid by the client requesting the video stream). Alternatively or additionally, the QoS ratings of streams depend on the content of the stream, its quality level and/or the payment of the provider of the video stream.

Optionally, size reduction is first applied to video streams directed to clients having low QoS ratings. Only after low QoS video streams were compressed to a maximal extent, is size reduction applied to video streams of higher QoS ratings, if necessary. Alternatively, the decision of which video streams are reduced in size is performed in a few rounds or using any other heuristic. In a first round, video streams are selected for a moderate size reduction. If the size reduction achieved from the moderate compression of all the video streams is not sufficient, a stronger size reduction is applied to the video streams according to the order of the QoS ratings of the streams.

Alternatively or additionally, multiplexer 112 chooses sub-portions 302 to be reduced, not necessarily with relation to the video streams to which they belong. In some embodiments of the invention, the sub-portions 302 to be replaced are selected according to a determination of the amount of bandwidth which can be saved by their replacement, e.g., the sub-portions which provide a best compression ratio relative to image degradation are selected. In some embodiments of the invention, the determination of the savings is performed by accessing the metadata of the video streams. Alternatively or additionally, clients may be promised by multiplexers 112 a minimal guaranteed bandwidth and/or a maximal bandwidth, and the sub-portions 302 replaced are chosen under these constraints.

In an exemplary embodiment of the invention, each replaceable sub-portion 302 is given a replacement score which depends on a QoS rating of the stream to which it belongs and a quality and/or compression rating of the sub-portion itself. The sub-portions 302 to be replaced are optionally chosen according to the replacement scores of the sub-portions. When a replaceable sub-portion 302 has more than one replacement object 312, multiplexers 112 optionally select the replacement objects 312 to be used according to calculated saving ratios, between the saving in replacing a sub-portion 302 by a respective replacement object 312 and the quality degradation caused by the replacement, as appearing in the metadata. In some embodiments of the invention, the calculated ratios are multiplied by weights which are a function of the QoS ratings of the different video streams. Using proper weights can make sure that only a replacement object 312 with a high saving ratio is used for a video stream of a high QoS rating before replacement objects of a low QoS rating video stream.

Alternatively to using a ratio between compression saving and quality degradation, any other suitable function connection (e.g., a non-linear function) between the compression saving, the quality degradation and any other attribute (e.g., QoS) is used.

Further alternatively or additionally, the sub-portions 302 to be replaced and/or the replacement objects to be used are selected based on the frame (e.g., type, location) to which the sub-portion belongs and/or the pixel values of the image in the sub-portion (e.g., the average brightness of the image, spatial complexity, temporal activity).

In some embodiments of the invention, each interchangeable block is assigned a score by pre-processing unit 102 and multiplexer 112 selects the blocks to be used according to the assigned scores. The score may be set based on one or more (or even all) of the above described considerations. Multiplexers 112 may rely solely on the scores or may use additional considerations. Alternatively or additionally to providing a single score, the metadata may include a plurality of intermediate measures that are to be used by multiplexers 112, such as the average brightness of each image, the spatial complexity and/or temporal activity. Further alternatively or additionally, the value of one or more of the parameters used in the decision is determined by multiplexers 112 by examining the video content of the video media. This alternative may be used, for example, when a specific multiplexer uses a special attribute not (yet) supported by most other multiplexers 112.

In some embodiments of the invention, when a slot has a capacity larger than required for the video streams, one or more of the video streams is increased in size in order to provide a higher quality video transmission. Optionally, the increase is performed by replacing sub-portions 302 by corresponding larger replacement objects 312. The video stream to enjoy the increase may be chosen using any of the methods described above regarding the decrease, with adaptation (e.g., choosing a high QoS stream instead of a low QoS link). Alternatively, as mentioned above, blocks which are not yet required are transmitted early.

In some embodiments of the invention, peripheral multiplexer 112 buffers the video streams it receives for a predetermined time (e.g., 50-100 milliseconds) in order to allow for the replacement of sub-portions 302 by respective replacement objects, when so required. Alternatively, a longer buffering period is used, in order to allow for determining of more optimal selections of interchangeable blocks of the video streams. In some embodiments of the invention, the metadata of video streams includes information on the bit rate of the video stream over the entire length of the video stream. The bit rate information is optionally used by peripheral multiplexer 112 in determining the required compression acts over time, without examining the actual video data.

In the above example, a specific multiplexing method was described. It is noted, however, that any statistical multiplexing method may be used in accordance with embodiments of the invention, including methods which perform smoothing and size reduction interleaved and/or in parallel.

While the above embodiment relates to tasks performed by multiplexer 112 and preprocessing unit 102, in some embodiments of the invention the tasks are distributed between more than two units. For example, the determination of whether to perform the replacement may be performed by a separate unit from multiplexer 112. In some embodiments of the invention, a plurality of multiplexers may perform the method of FIG. 5 in sequence on a video stream passing from preprocessing unit 102 to a client 150. For example, a communication link leading over a first portion of the path to multiplexer 112 may have limited bandwidth, although not as limited as of channel 142. An intermediate multiplexer between preprocessing unit 102 and multiplexer 112 may perform some replacements required to transmit the video stream to multiplexer 112, while additional replacements are performed by multiplexer 112.

Although the above description relates to using a metadata record for statistical multiplexing of a video stream, it is noted that metadata files are advantageous in multiplexing of substantially any other data units, including other multimedia streams and files and non-multimedia data units, such as data files. Furthermore, the metadata record is not necessarily used with data units having interchangeable blocks. The metadata may be used, for example, by a statistical multiplexer that performs complete recompression of blocks which need to be reduced in size. The metadata is optionally used to determine which portions will provide a desired compression extent without too much quality degradation. Alternatively or additionally, the metadata is used to determine the timing order at which blocks of different video streams are transmitted on channel 142.

In some embodiments of the invention, multiplexer 112 receives the metadata well before providing of the video media to the client. For example, when clients pre-schedule the providing of VoD video media. Multiplexer 112 may process the metadata and determine which replacements are to be performed well before receiving the video media (e.g., at least 10 minutes, 30 minutes or even an hour before receiving the video media). Thus, when the video stream is received, all the multiplexer needs to do is perform predetermined replacements that were earlier determined to be performed based on the metadata. The advanced handling by multiplexer 112 may be of shorter advance, for example completing the review of the metadata of each sub-portion of the video media, at least 10, 20 or 30 seconds before the sub-portion is received by the multiplexer. In some embodiments of the invention, multiplexer 112 performs the processing in advance when possible, while when the multiplexer is loaded the metadata of some sub-portions is handled only when the sub-portion is received by the multiplexer.

Replacement in Lower Protocol Layer

In some embodiments of the invention, multiplexers 112 perform statistical multiplexing on the video streams at the protocol layer of media units 304. The protocol layer includes, for example, the MPEG-2 Video codec (ITU-T H.262), the MPEG-4 Video codec, the ITU-T H.264 codec, SMPTE VC-9 or the Window Media 9 Video codec.

In accordance with these embodiments, multiplexers 112 optionally encapsulate the video streams they handle in transport protocol layer packets, in performing the statistical multiplexing. In some embodiments of the invention, multiplexers 112 receive the video streams encapsulated in transport protocol packets and remove the transport layer encapsulation before performing the statistical multiplexing. Alternatively, the video streams are received without the low (e.g., transport) protocol layer encapsulation (e.g., as a video encoding stream VES).

In other embodiments of the invention, as described below with reference to FIG. 6, multiplexers 112 perform the replacement of interchangeable blocks in a low protocol layer, such as a transport layer, e.g., UDP, PES and/or MPEG-2 transport stream layer. Optionally, in accordance with these embodiments, multiplexers 112 receive the video stream in the form of low layer transport packets (e.g., MPEG-2 TS packets) and the replacement of sub-portions 302 includes replacing groups of one or more transport packets in the stream with replacement blocks, which include transport protocol packets. These embodiments allow the operation of multiplexers 112 to be very simple, such that they could be implemented nearly only in hardware. In an exemplary embodiment of the invention, the replacement of the packets is performed by a direct memory access (DMA) unit or a similar hardware. In the following description, for brevity, emphasis is put on the differences from the above described embodiments. Generally, unless otherwise specified, the options described above are applicable also in the following embodiments.

Figure 6:
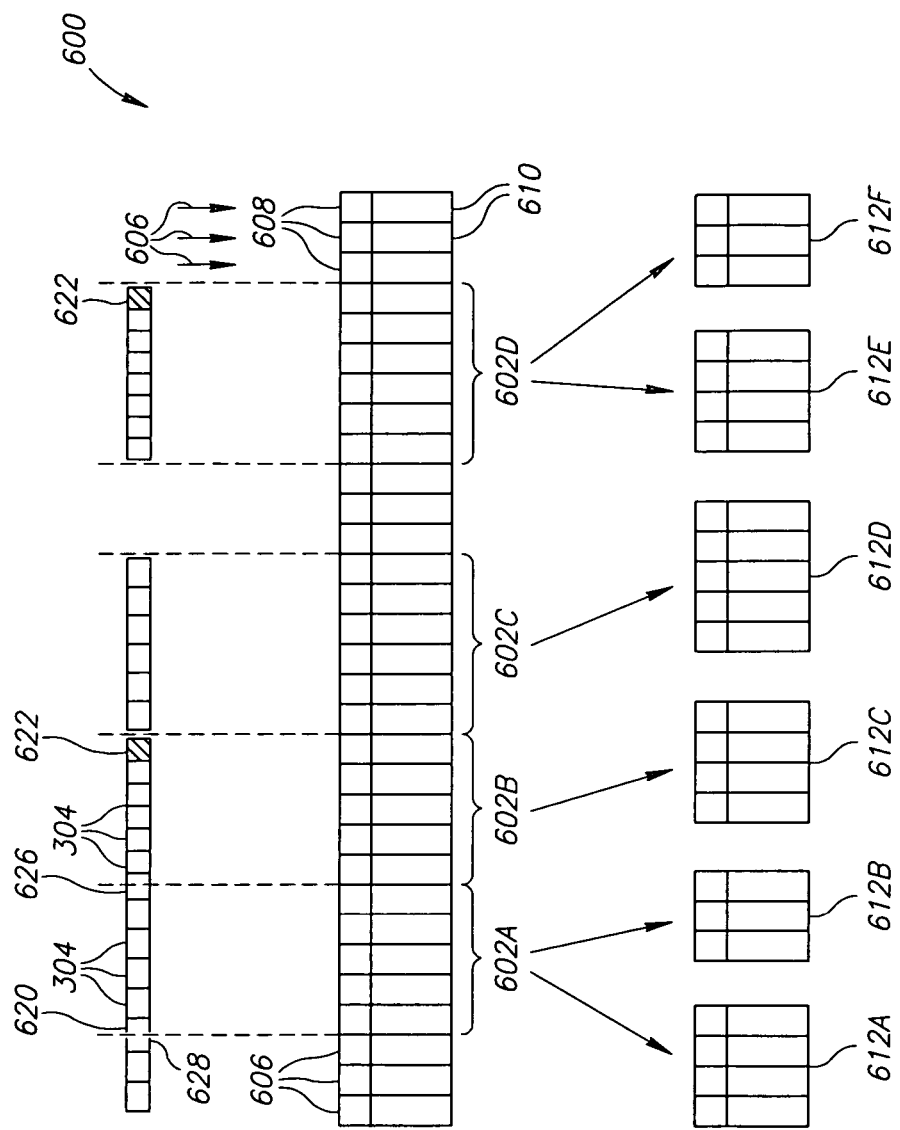
FIG. 6 is a schematic illustration of a portion of a video stream, with identified replaceable sub-portions, in accordance with an exemplary embodiment of the invention.

FIG. 6 is a schematic illustration of a portion of a video stream 600, with identified replaceable sub-portions 602 (marked 602A, 602B, 602C, etc.), in accordance with an exemplary embodiment of the invention. Video stream 600 is formed of a sequence of transport layer (e.g., MPEG-2 transport stream) packets 606, which are generally formed of headers 608 and payloads 610, which include video data. Generally, all of packets 606 are of a same size, although this is not required in order to perform the invention.

In some embodiments of the invention, each sub-portion 602 includes a plurality of packets 606, which include payload data that represents one or more video media units 304, or portions of media units 304. For each sub-portion 602, pre-processing unit 102 generates one or more replacement objects 612 including one or more packets 606. The payload of the replacement objects 612 optionally represents the same data as the sub-portion 602 it corresponds to, with the one or more media units 304 being more compressed or less compressed than in the sub-portions 602.

Optionally, sub-portions 602 do not include in their payload, data beyond that representing the one or more media units 304. This option is represented by sub-portions 602C and 602D, which do not include partial media units 304. Not including only part of a media unit 304 in a sub-portion 602 simplifies the defining of sub-portions and allows compression of all the media units in the payload, as in some embodiments, media units 304 not included in a single sub-portion 602 are not compressed in the replacement objects 612.

In some embodiments of the invention, in order to ensure that sub-portions 602 (which include whole packets 606) include complete media units 304, padding 622 is added, by preprocessing unit 102, to the upper protocol layer video stream that is formed of media units 304. Alternatively or additionally, when possible, preprocessing unit 102 selects for serving as sub-portions 602, groups of packets 606 that include whole media units 304 only.

Alternatively to adding the padding in the video stream protocol layer, the padding is added in the transport layer. In the above example, the padding is added in the sub-portion for which one or more replacement objects are generated, in order to have the replacement objects fit into complete packets. In other embodiments of the invention, the padding is added to a sub-portion for which replacement objects are not created, for example a sub-portion immediately before a sub-portion for which replacement objects are created. In these embodiments, the padding allows the following sub-portion to have a desired size for fitting into a whole number of packets.

In some embodiments of the invention, the padding is performed on a local basis whenever needed. Alternatively, preprocessing unit 102 reviews the entire video stream and adds padding based on a global view of the entire stream, so as to minimize the amount of padding added.

Alternatively or additionally, sub-portions 602 (as represented by sub-portions 602A and 602B) may include parts of a media unit 304, as represented by part 620. In some cases, parts of a media unit 626 are included in two different sub-portions 602A and 602B. In other cases, the other part 628 of a media unit having a part 620 included in a sub-portion 602, is not included within any sub-portion 602. Part 620 is optionally copied, without compression, from sub-portion 602 to the corresponding replacement object(s) 612 as its compression, without corresponding compression of the other part 628 of the media unit may prevent decoding by client 150. Alternatively, the compression of part 620 is performed in such a manner that regardless of whether sub-portion 602A, replacement object 612A or replacement object 612B is received by the client, the media unit including part 620 is decodable.

As stated above, the media units 304 may include one or more video groups of pictures (GOPs), video frames, video slices or even macro-blocks.

In some embodiments of the invention, substantially all the sub-portions 602 of a single stream are of substantially a same number of packets. Alternatively, different sub-portions 602 of a single stream may have different sizes. This alternative allows more flexibility in finding sub-portions 602 beginning and ending on borders between media units 304. In addition, this alternative allows more flexibility to peripheral multiplexers 112 in determining which sub-portions 602 to replace for statistical multiplexing, in order to achieve its bandwidth requirements. In some embodiments of the invention, preprocessing unit 102 purposely defines some small sub-portions 602 and some large sub-portions 602 in order to allow multiplexers 112 maximal flexibility in performing the statistical multiplexing.

The preprocessing in accordance with these embodiments is similar to that described in accordance with FIG. 2. The generating (206) of replacement objects optionally includes selecting a number of packets into which the sub-portion 602 is to be compressed and compressing accordingly. The generated replacement objects 612 are packed in packets which can easily replace the packets of the sub-portion. It is noted that when the transport protocol allows using packets of different sizes, pre-processing unit 102 optionally changes the sizes of the packets according to the desired compression.

The determining (204) of sub-portions 602 optionally includes finding sub-portions that fit into packets as discussed above with reference to FIG. 6.

The metadata entries optionally indicate the packets in which each access unit is placed as well as some or all of the data mentioned above as being included in the metadata.

The statistical multiplexing is optionally performed as described in FIG. 5. The packaging (514) of the stream into low layer packets is optionally replaced by an adjustment act in which the numbering of the packets is corrected according to the change in the number of packets due to any packet replacements and/or assigning correct time stamps to the packets according to the actual transmission times. In some embodiments of the invention, the packets of the stream are renumbered (e.g. renumbering of the continuity counter in the headers of MPEG-2 transport stream packets) in order to have consecutive packet numbers after the number of packets are reduced due to the replacement of sub-portions 602 with replacement objects 612. Alternatively or additionally, multiplexer 112 re-stamps the program clock references (PCRs) or adds PCRs, in order to compensate for the timing changes due to the statistical multiplexing. Multiplexer 112 optionally performs any other tasks required in order to make sure that the adjusted stream conforms to timing constraints of the protocol governing the transmitted video stream, e.g., the MPEG-2 TS protocol and/or the MPEG-2 VES protocol.

Alternatively to having all the interchangeable blocks belonging to a single protocol (e.g., having same headers), different portions of the video media have blocks in different protocol layers, for example according to the chance that blocks of the stream will be replaced. Furthermore, different interchangeable blocks may have different levels of low layer encapsulation. For example, some blocks may not have encapsulation, some blocks may have PES encapsulation and some blocks have transport layer encapsulation. It is noted that in some cases blocks may be encapsulated in PES and then be further encapsulated with TS.

Configuration Details of System 100

Preprocessing unit 102 is optionally located in a general location, for example near satellite dish 104 and/or movie bank 106. In some embodiments of the invention, preprocessing unit 102 is relatively far from at least some of multiplexers 112, for example being distanced by at least 100 meters or even more than 10 kilometers. Alternatively or additionally, processing unit 102 is located near one or more of multiplexers 112. In some embodiments of the invention, processing unit 102 is located on a same silicon chip or within a single housing, with one or more multiplexers 112.

Optionally, each multiplexer 112 is located at the entrance to the communication channel(s) which it controls, so that the resulting multiplexed video stream does not need to be transferred through a backbone network to the controlled communication channel. In some embodiments of the invention, the preprocessed video streams are multicast to all multiplexers 112 that require the video stream (for example, in a multicast transmission), as the preprocessed video streams do not differ in details like the statistically multiplexed video streams. Alternatively or additionally, some or all of multiplexers 112 are located remote from the channels 142 they control, allowing grouping a plurality of multiplexers 112 into a single housing, onto a single chip or even as different software processes on a single processor. In some embodiments of the invention, a single software process handles a plurality of channels 142. One or more switches, modems and/or routers may be located between multiplexers 112 and the channels 142 they control. Information on the current network capacity and/or utilization of the channel 142 is optionally transmitted to multiplexer 112 by a network element at the entrance to the channel 142 (e.g., a switch) and/or at a termination point of channel 142 (e.g., a home gateway).

In some embodiments of the invention, one or more of multiplexers 112 are implemented as software processes on a general purpose processor. By preprocessing some or all of the statistically multiplexed video streams, the processing resources required for the statistical multiplexing are lower than heretofore required, such that it is feasible to perform the statistical multiplexing in software.

In an exemplary embodiment of the invention, software run on a 3 GHz processor, such as a Xeon processor used in general purpose server computers (e.g., super-micro 6014)

can handle at least 1 Gbps of media, or even at least 3 Gbps. Optionally, this software handles concurrently at least 20 media streams or even at least 40 media streams.

Optionally, the statistical multiplexing is performed by a software process running on a processor that performs at least one other server or network task. In an exemplary embodiment of the invention, a statistical multiplexer 112A (FIG. 1), operates within a same housing and/or on a same processor array as a VoD server, which manages retrieval of video media from storage units. Optionally, the VoD server performs multi-layer caching.

In other embodiments of the invention, a statistical multiplexer 112B (FIG. 1), operates within a same housing and/or on a same processor array as a DSLAM. In some embodiments of the invention, the statistical multiplexer and the DSLAM and/or VoD server share one or more of a backplane bus, power source, memory storage unit, external communication interfaces and shared management unit.

Alternatively to including a single pre-processing unit 102, a plurality of pre-processing units 102 are used. In an exemplary embodiment of the invention, each pre-processing unit operates on different video streams. Alternatively or additionally, different pre-processing units 102 pre-process the same video stream for different types of channels 142, such that the pre-processing is adapted for the specific bandwidth and characteristics (e.g., noise levels) of the types of channels 142 on which the video stream is delivered to the clients.

Although in the above description each channel 142 is shown as being controlled and fed by a single multiplexer 112, in some embodiments of the invention, a single channel 142 is fed with data by a plurality of multiplexers. Optionally, one of the multiplexers serves as a master that controls the channel 142, while the other multiplexers 142 only supply the data. Alternatively, different ones of the multiplexers control different portions of the bandwidth of channel 142, such that the bandwidth fitting control of the channel is performed together by a plurality of the feeding multiplexers.

In the above description, sub-portions 302 do not overlap with each other. In some embodiments of the invention, however, some sub-portions 302 overlap. Optionally, one or more small sub-portions are entirely included in a large sub-portion 102. Multiplexer 112 determines whether to use the replacement objects of the small sub-portions or of the large sub-portion (or neither), according to the conditions of channel 142. This provides more flexibility to statistical multiplexers 112.

In the above description, statistical multiplexers 112 are provided with a video stream and replacement objects 312. The video stream and the replacement blocks both include building blocks from which a video stream can be reconstructed. In other embodiments of the invention, statistical multiplexers 112 are provided with metadata and building blocks, not organized in a video stream. Multiplexers 112 reconstruct a video stream from the received building blocks. As discussed regarding the video streams, the building blocks may be fetched block by block by the multiplexers or may be streamed to the multiplexers. In some embodiments of the invention, when a large number of blocks are required from a single file portion, the entire file portion is fetched in order to reduce the overhead involved in fetching the blocks. Alternatively or additionally, each time a block is to be fetched, the block is fetched along with neighboring blocks which may be required in multiplexing further portions of the video stream.

It is noted that for video streams that were preprocessed in advance (i.e., not in real time), the total delay of system 100 between the time multiplexer 112 is instructed to start streaming a video media and the time a first statistically multiplexed packet reaches client 150, is very short, for example between about 50-1000 milliseconds. For real time video streams, the total delay of pre-processing unit 102 is optionally between about 2-4 seconds, allowing for sufficient preprocessing time. The delay of multiplexer 112 between the time the video media arrives at multiplexer 112 and the time it leaves the multiplexer is optionally very short, for example between 50-1000 milliseconds.

The non-real-time video streams may include, for example, video on demand (VoD) movies, captured TV programs, such as TV on demand and/or nPVR, and/or any other video streams which are available to system 100 before they are supplied to clients 150.

In the above description, use of interchangeable blocks in a multimedia stream is performed in order to control the capacity of the stream. In some embodiments of the invention, however, the use of interchangeable blocks is performed alternatively or additionally for other reasons, for example in order to replace content of a video media. For example, interchangeable blocks may be used to represent different brands of a product shown in the video stream. Optionally, statistical multiplexers 112 determine which brand to use according to the number and/or profile of the users receiving the video stream. In other embodiments of the invention, the replacement is performed to add advertisements when there is available bandwidth.

It will be appreciated that the above described methods may be varied in many ways, including, changing the order of steps, and/or performing a plurality of steps concurrently. It should also be appreciated that the above described description of methods and apparatus are to be interpreted as including apparatus for carrying out the methods and methods of using the apparatus. The present invention has been described using non-limiting detailed descriptions of embodiments thereof that are provided by way of example and are not intended to limit the scope of the invention. Many specific implementation details may be used. For example, in FIG. 2, the metadata entry could be generated before the replacement objects or they could be generated in parallel. In addition, the video streams may include embedded data of other formats.

It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art. Furthermore, the terms "comprise," "include," "have" and their conjugates, shall mean, when used in the claims, "including but not necessarily limited to."

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims.

The invention claimed is:

1. A method of distributed statistical multiplexing of video data, comprising:

generating a plurality of blocks forming a pre-processed video media corresponding to an original video program formed of consecutive sub-portions of image content, the plurality of blocks including, for each of one or more sub-portions of the original video program, a plurality of interchangeable blocks that represent the same image content of the sub-portion, but have different sizes, and can be used interchangeably without changing other sub-portions of the pre-processed video media;

transmitting at least some of the blocks, including for one or more sub-portions of the original video program a plurality of interchangeable blocks representing the sub-portion, to at least one remote multiplexer over a standard communication link;

reconstructing a plurality of versions of the video media by the at least one multiplexer, for a plurality of communication channels, from at least some of the transmitted blocks, the reconstruction of each version including selecting for each sub-portion of the original video program, a single block to represent the sub-portion; and transmitting the plurality of reconstructed versions of the video media on the plurality of communication channels to respective different clients, wherein the blocks that can be used interchangeably to represent a sub-portion, represent the same image content, but have different sizes, wherein generating a pre-processed video media comprises generating a plurality of blocks for at least some sub-portions of the original video program and only a single block for one or more other sub-portions, wherein generating a pre-processed video media comprises selecting sub-portions for which a plurality of interchangeable blocks representing the same image content are generated and wherein the selection is performed responsive to an evaluation for each sub-portion of pixel values of the frames to which the sub-portion belongs, and wherein transmitting at least one of the blocks to a multiplexer comprises transmitting fewer than all the generated blocks to the multiplexer, such that one or more of the generated interchangeable blocks are never transmitted to the multiplexer.

2. A method according to claim 1, wherein generating the pre-processed video media comprises generating a pre-processed video stream and a plurality of replacement blocks for one or more sub-portions of the video stream and wherein transmitting the at least some of the blocks comprises transmitting the video stream and at least some of the replacement blocks.

3. A method according to claim 2, wherein at least one of the replacement blocks is greater in size than its corresponding sub-portion of the video stream.

4. A method according to claim 2, wherein at least one of the replacement blocks is smaller in size than its corresponding sub-portion of the video stream.

5. A method according to claim 1, wherein generating a pre-processed video media comprises generating for at least one sub-portion, at least three interchangeable blocks.

6. A method according to claim 1, wherein generating a pre-processed video media comprises selecting sub-portions for which a plurality of blocks are generated responsive to the types of frames to which the sub-portions belong.

7. A method according to claim 1, wherein generating a pre-processed video media comprises selecting sub-portions for which a plurality of blocks are generated responsive to the locations within a group of pictures GOP of frames to which the sub-portions belong.

8. A method according to claim 1, wherein generating a pre-processed video media comprises selecting sub-portions for which a plurality of interchangeable blocks representing the same image content are generated and wherein the selection is performed responsive to a determination for each sub-portion of an extent of change in the sub-portion relative to neighboring images in the video stream.

9. A method according to claim 1, wherein generating a pre-processed video media comprises selecting sub-portions for which a plurality of interchangeable blocks representing the same image content are generated responsive to the complexity of the images in the vicinity of the sub-portion in the video stream.

10. A method according to claim 1, wherein transmitting at least one of the blocks to a multiplexer comprises transmitting all the generated blocks to the multiplexer.

11. A method according to claim 1, wherein transmitting at least one of the blocks to a multiplexer comprises retrieving the blocks selectively by the multiplexer.

12. A method according to claim 11, wherein transmitting at least one of the blocks to a multiplexer comprises fetching only blocks required by the multiplexer.

13. A method according to claim 11, comprising transmitting a metadata description of the generated blocks to the multiplexer and fetching by the multiplexer based on the metadata.

14. A method according to claim 12, wherein fetching the required blocks comprises fetching responsive to the current capacity and load on a channel controlled by the multiplexer.

15. A method according to claim 1, wherein generating a pre-processed video media comprises generating a plurality of blocks, and storing the blocks in a plurality of separate files.

16. A method according to claim 1, wherein transmitting at least one of the blocks to a multiplexer comprises pushing the blocks by a transmitter, to the multiplexer.

17. A method according to claim 1, wherein transmitting at least one of the blocks to a multiplexer comprises transmitting all the transmitted blocks of the video media on a single channel.

18. A method according to claim 1, wherein transmitting at least one of the blocks to a multiplexer comprises transmitting the transmitted blocks of the video media on a plurality of channels.

19. A method according to claim 1, wherein transmitting at least one of the blocks to a multiplexer comprises transmitting at least some of the transmitted blocks over a Local Area Network LAN.

20. A method according to claim 1, wherein transmitting at least one of the blocks to a multiplexer comprises transmitting all the transmitted blocks of the video media over a Wide Area Network WAN or a Metropolitan Area Network MAN.

21. A method according to claim 1, wherein reconstructing the plurality of versions of the video media comprises reconstructing each version responsive to the current available bandwidth on the respective channel onto which the video media version is transmitted and an amount of data, other than the video media, to be forwarded on the channel.

22. A method according to claim 1, wherein transmitting at least some of the blocks to a multiplexer comprises transmitting all the transmitted blocks from a same source.

23. A method according to claim 1, wherein transmitting at least some of the blocks to a multiplexer comprises transmitting the transmitted blocks from a plurality of separate sources.

24. A method according to claim 1, wherein all the blocks are generated before any of the blocks is transmitted to the multiplexer.

25. A method according to claim 1, wherein transmitting at least some of the blocks to a multiplexer comprises transmitting over a distance of at least 50 meters.

26. A method according to claim 1, wherein transmitting at least some of the blocks to a multiplexer comprises transmitting at least some of the blocks to at least five different multiplexers.

27. A method according to claim 26, wherein transmitting at least some of the blocks to a multiplexer comprises transmitting the same blocks to a group of multiplexers, in a geographical location or distribution network that includes a plurality of multiplexers.

28. A method according to claim 26, wherein transmitting at least some of the blocks to a multiplexer comprises transmitting different subsets of blocks representing the original video program to different multiplexers.

29. A method according to claim 1, wherein the blocks are generated in real time, less than five minutes before their transmission.

30. A method according to claim 1, wherein the blocks are generated in real time, less than five minutes before the reconstruction of their respective sub-portion in the video media by the multiplexer.

31. A method according to claim 1, wherein the blocks are stored in one or more intermediate storage devices between the pre-processing and the transmission.

32. A method according to claim 31, wherein the blocks are delivered from the intermediate storage in accordance with a storage access protocol.

33. A method according to claim 1, wherein the blocks are generated at least an hour before the reconstruction of the video media by the multiplexer.

34. A method according to claim 1, wherein generating the blocks further includes generating for at least some of the sub-portions, blocks that represent different image content that can be used interchangeably for the sub-portion.

35. A method according to claim 1, wherein the blocks that can be used interchangeably to represent a sub-portion comprise blocks of a compressed video protocol layer, without transport layer encapsulation.

36. A method according to claim 35, wherein the at least one multiplexer receives at least some of the blocks without transport layer encapsulation and adds transport layer encapsulation to these blocks after reconstruction.

37. A method according to claim 35, wherein the at least one multiplexer receives at least some of the blocks with transport layer encapsulation, removes the encapsulation, reconstructs the video media and then adds transport layer encapsulation to the blocks.

38. A method according to claim 1, wherein at least some of the blocks that can be used interchangeably to represent a sub-portion comprise transport layer encapsulation.

39. A method according to claim 38, wherein at least some of the sub-portions of the video media include image data from a plurality of media units and wherein for at least one sub-portion the data of at least one of the media units is the same for all the interchangeable blocks representing the sub-portion.

40. A method according to claim 1, wherein at least some of the blocks include one or more whole image slices or image macro blocks.

41. A method according to claim 1, wherein at least some of the blocks are smaller than a single video frame.

42. A method according to claim 1, wherein at least some of the blocks are smaller than a group of frames.

43. A method according to claim 1, wherein transmitting at least one of the blocks to a multiplexer comprises transmitting using an IP or Ethernet protocol.

44. A method according to claim 1, wherein at least some of the blocks represent less than half a frame of video data.

45. A method according to claim 44, wherein each of the blocks represents less than 5 seconds of video data.

46. A method according to claim 1, wherein for at least one sub-portion, the blocks that can be used interchangeably to represent the sub-portion comprise at least one media unit identical in all the blocks and at least one media unit that is represented differently in different ones of the blocks.

47. A method according to claim 1, wherein the blocks that can be used interchangeably to represent a sub-portion comprise at least some blocks with transport layer encapsulation and at least some blocks without transport layer encapsulation.

48. A method according to claim 1, wherein generating a plurality of blocks forming a pre-processed video media comprises generating a plurality of blocks that are encrypted and a plurality of blocks that are not encrypted.

49. A method according to claim 48, wherein blocks of sub-portions having a plurality of interchangeable blocks are not encrypted.

50. A method according to claim 1, wherein generating the pre-processed video media is performed utilizing both an unencrypted version of the video media and an encrypted version of the video media.

51. A method according to claim 50, wherein the blocks that can be used interchangeably are processed from the unencrypted copy of the video media.

52. A method according to claim 50, wherein the blocks that can be used interchangeably are selected such that they do not span over a crypto-period boundary of the encrypted video media.

53. A method according to claim 1, wherein substantially all the generated blocks are encrypted.

54. A method according to claim 1, wherein the pre-processed video media is greater than the original video program by less than 30%.

55. A statistical multiplexer, comprising:
an input interface connected to a standard communication link;
an output interface leading to a communication channel; and
a processor configured to receive for a video media corresponding to an original video program formed of consecutive sub-portions of image content, through the input interface, a plurality of blocks including for one or more sub-portions of the original video program, a plurality of blocks having different sizes that can be used interchangeably to represent the same image content for the sub-portion without changing other sub-portions of the video media,
selecting for each sub-portion of the original video program, a single block to represent the sub-portion,
reconstructing a plurality of versions of the video media from the selected blocks, and
transmitting the plurality of reconstructed versions through the output interface to respective different clients,
wherein the processor is configured to generate a plurality of blocks for at least some sub-portions of the original video program and only a single block for one or more other sub-portions,
wherein the processor is configured to select sub-portions for which a plurality of interchangeable blocks representing the same image content are generated and wherein the selection is performed responsive to an evaluation for each sub-portion of pixel values of the frames to which the sub-portion belongs, and
wherein the processor is configured to transmit fewer than all the generated blocks through the output interface, such that one or more of the generated interchangeable blocks are never transmitted to the output interface.

56. A multiplexer according to claim 55, wherein the standard communication link comprises an IP or Ethernet communication link.

57. A multiplexer according to claim 55, wherein the standard communication link comprises a wireless communication link.

58. A method according to claim 1, wherein generating the plurality of blocks forming a pre-processed video media comprises generating the blocks in advance, before the reconstructing.

59. A method according to claim 1, wherein transmitting the plurality of reconstructed versions comprises transmitting in accordance with a video on demand service.

60. A method according to claim 1, wherein transmitting the plurality of reconstructed versions comprises transmitting over a cable network.

61. A method according to claim 1, wherein at least some of the blocks are smaller than a single video frame.

62. A method according to claim 23, wherein at least some of the blocks are smaller than a single video frame.

63. A method according to claim 24, wherein at least some of the blocks are smaller than a single video frame.

* * * * *